United States Patent
Hino et al.

(10) Patent No.: US 9,705,374 B2
(45) Date of Patent: Jul. 11, 2017

(54) ROTARY ELECTRIC MACHINE AND A MANUFACTURING METHOD THEREOF

(71) Applicant: MITSUBISHI ELECTRIC CORPORATION, Chiyoda-ku, Tokyo (JP)

(72) Inventors: Tatsuro Hino, Tokyo (JP); Akihiro Yamamura, Tokyo (JP); Shuichi Tamura, Tokyo (JP); Akira Hashimoto, Tokyo (JP); Tetsuya Yokogawa, Tokyo (JP); Atsushi Sakaue, Tokyo (JP); Kazunori Muto, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 15/307,286

(22) PCT Filed: Apr. 28, 2015

(86) PCT No.: PCT/JP2015/062826
§ 371 (c)(1),
(2) Date: Oct. 27, 2016

(87) PCT Pub. No.: WO2015/174277
PCT Pub. Date: Nov. 19, 2015

(65) Prior Publication Data
US 2017/0047808 A1   Feb. 16, 2017

(30) Foreign Application Priority Data
May 15, 2014   (JP) .................... 2014-101585

(51) Int. Cl.
*H02K 3/38* (2006.01)
*H02K 3/04* (2006.01)
(Continued)

(52) U.S. Cl.
CPC ............... *H02K 3/345* (2013.01); *H02K 3/12* (2013.01); *H02K 3/38* (2013.01); *H02K 15/105* (2013.01)

(58) Field of Classification Search
CPC ............... H02K 3/30; H02K 3/32; H02K 3/38
(Continued)

(56) References Cited

U.S. PATENT DOCUMENTS

| 5,659,219 A | 8/1997 | Momose et al. |
| 2013/0307368 A1 | 11/2013 | Suwazono et al. |

(Continued)

FOREIGN PATENT DOCUMENTS

| JP | 57-062745 A | 4/1982 | |
| JP | 57062745 A | * 4/1982 | ............... H02K 3/38 |

(Continued)

OTHER PUBLICATIONS

International Search Report (PCT/ISA/210) issued on Aug. 4, 2015, by the Japanese Patent Office as the International Searching Authority for International Application No. PCT/JP2015/062826.
(Continued)

*Primary Examiner* — Thomas Truong
(74) *Attorney, Agent, or Firm* — Buchanan Ingersoll & Rooney PC

(57) ABSTRACT

A radially outer insulating paper includes: an annular radially outer insulating paper base portion that is disposed on a radially inner side of a row of first coil terminals; and radially outer insulating paper protruding portions that each protrude radially outward from an axially outer end portion of the radially outer insulating paper base portion, and that are inserted between adjacent first coil terminals axially further outward than second bent portions; and a radially inner insulating paper includes: an annular radially inner insulating paper base portion that is disposed on a radially outer side of a row of second coil terminals; and radially inner insulating paper protruding portions that each protrude radially inward from an axially outer end portion of the radially inner insulating paper base portion, and that are inserted between adjacent second coil terminals axially further outward than fourth bent portions.

11 Claims, 21 Drawing Sheets

(51) Int. Cl.
*H02K 15/10* (2006.01)
*H02K 3/34* (2006.01)
*H02K 3/12* (2006.01)

(58) Field of Classification Search
USPC .......................................... 310/214, 215, 260
IPC ..................................... H02K 3/32,3/38, 15/10
See application file for complete search history.

(56) References Cited

U.S. PATENT DOCUMENTS

2014/0127055 A1* 5/2014 Horiba .................... F04C 23/02
417/410.5
2015/0171693 A1 6/2015 Sakaue et al.

FOREIGN PATENT DOCUMENTS

| JP | 07-298530 A | | 11/1995 |
|----|----|----|----|
| JP | 2001-095186 A | | 4/2001 |
| JP | 2004-032964 A | | 1/2004 |
| JP | 2005-224040 A | | 8/2005 |
| JP | 2011-036093 A | | 2/2011 |
| JP | 2011-139588 A | | 7/2011 |
| JP | 2011234429 A | * | 11/2011 |
| WO | WO 2012/053464 A | | 4/2012 |
| WO | WO 2014/034157 A1 | | 3/2014 |

OTHER PUBLICATIONS

Written Opinion (PCT/ISA/237) issued on Aug. 4, 2015, by the Japanese Patent Office as the International Searching Authority for International Application No. PCT/JP2015/062826.

* cited by examiner

ROTARY ELECTRIC MACHINE AND A MANUFACTURING METHOD THEREOF

TECHNICAL FIELD

The present invention relates to a rotary electric machine such as an electric motor or a generator, for example, and to a manufacturing method therefor, and particularly relates to an insulating construction for coil terminals of coils that constitute an armature winding.

BACKGROUND ART

In a conventional rotary electric machine that is described in Patent Literature 1, a plurality of U-shaped segment conductors are mounted to an armature core so as to be arranged circumferentially, and strip-shaped insulating sheets are inserted into spaces that are formed inside return portions of the segment conductors that are arranged circumferentially, to ensure electrical insulation in coil ends that are formed by the return portions.

However, in the conventional rotary electric machine that is described in Patent Literature 1, no consideration has been given to electrical insulation in open end portions of the segment conductors that protrude outward from the armature core.

In a conventional rotary electric machine that is described in Patent Literature 2, electrical insulation in open end portions of segment conductors that protrude outward from an armature core is ensured using coil end spacers that have a plurality of compartment projections that protrude outward from a main wall that is a ring-shaped strip and an inner circumferential surface of the main wall. Specifically, a large number of the segment conductors are mounted to the armature core. Next, in respective rows of open end portions of the segment conductors that protrude outward from the armature core and are arranged in single rows circumferentially, the coil end spacers are disposed so as to place the main wall portion alongside the rows of the open end portions, and such that the compartment projections are inserted between each of the circumferentially adjacent open end portions. Next, each row open end portion is made to incline by gripping tip end portions of the open end portions in a bending and twisting jig, and rotating the bending and twisting jig in a first circumferential direction while moving it axially toward the armature core. The main wall portion is thereby disposed between the rows of open end portions, and the compartment projections are disposed between inclined portions of the adjacent open end portions, to ensure electrical insulation in the open end portions.

CITATION LIST

Patent Literature

Patent Literature 1: Japanese Patent Laid-Open No. 2005-224040 (Gazette)
Patent Literature 2: Japanese Patent Laid-Open No. 2004-032964 (Gazette)

SUMMARY OF THE INVENTION

Problem to be Solved by the Invention

In Patent Literature 1, because no consideration has been given to electrical insulation in open end portions of the segment conductors that protrude outward from the armature core, one problem has been that electrical insulation in the open end portions of the segment conductors is reduced.

In Patent Literature 2, because the coil end spacers are disposed between the rows of open end portions and then the inclined portions are formed by twisting the open end portions in the first circumferential direction, the compartment projections of the coil end spacers that are positioned between the open end portions are twisted together with the open end portions. Thus, one problem has been that torsional stresses are concentrated at linking portions between the compartment projections and the main wall portion, leading to the occurrence of damage to the linking portions, reducing electrical insulation. Another problem has been that torsional stresses act on the main wall portion through the compartment projections, leading to deformation of the main wall portion, which also reduces electrical insulation.

In Patent Literature 2, a spacer holding mechanism is required to hold the coil end spacers that are disposed between the rows of open end portions. In addition, because torsional stresses act on the main wall portion through the compartment projections, the position of the main wall portion is not stable. Thus, because the spacer holding mechanism is a complicated mechanism, and is also a mechanism that fulfills requirements for an apparatus that twists and shapes the open end portions, another problem has been that this leads to increases in equipment costs.

The present invention aims to solve the above problems and an object of the present invention is to provide a rotary electric machine and a manufacturing method therefor that can ensure electrical insulation of coil terminals, to enable increases in voltage to be achieved, and that can also be manufactured using inexpensive equipment.

Means for Solving the Problem

A rotary electric machine according to the present invention includes an armature that includes: an annular armature core in which slots are arranged circumferentially; and an armature winding that is mounted to the armature core, the armature winding being configured by mounting coils to the armature core circumferentially at a pitch of one slot, the coils including: 2n rectilinear portions that are inserted into the slots, where n is an integer that is greater than or equal to one; and (2n−1) coil end portions that link the 2n rectilinear portions consecutively, and the coils being configured such that first coil terminals protrude outward at a first axial end of the armature core from a radially outermost position inside the slots, are bent at first bent portions in a vicinity of roots thereof so as to be inclined in a first circumferential direction, and are bent at second bent portions near tip ends so as to extend axially outward, and second coil terminals protrude outward at a first axial end of the armature core from a radially innermost position inside the slots, are bent at third bent portions in a vicinity of roots thereof so as to be inclined in the first circumferential direction or a second circumferential direction, and are bent at fourth bent portions near tip ends so as to extend axially outward. The rotary electric machine includes: a radially outer insulating paper that is mounted on a radially inner side of a row of the first coil terminals; and a radially inner insulating paper that is mounted on a radially outer side of a row of the second coil terminals; the radially outer insulating paper includes: an annular radially outer insulating paper base portion that is disposed so as to lie alongside the first coil terminals on the radially inner side of the row of first coil terminals; and radially outer insulating paper protruding portions that each protrude radially outward from an axially outer end portion of the radially outer insulating paper base portion, and that are inserted between adjacent first coil terminals axially further outward than the second bent portions; and the radially inner insulating paper includes: an annular radially inner insulating paper base portion that is disposed so as to lie alongside the second coil terminals on the radially outer side of the row of second coil terminals; and radially inner insulating paper protruding portions that each protrude radially inward from an axially outer end portion of the radially inner insulating paper base portion, and that are inserted between adjacent second coil terminals axially further outward than the fourth bent portions.

Effects of the Invention

According to the present invention, because the radially outer and radially inner insulating paper protruding portions are inserted axially further outward than the second and fourth bent portions of adjacent first and second coil terminals, gaps between the tip end portions of the first and second coil terminals can be maintained in a circumferential width of the radially outer and radially inner insulating paper protruding portions. Gaps between inclined portions that are positioned between the first bent portions and the second bent portions of the first coil terminals are ensured thereby, and gaps between inclined portions that are positioned between the third bent portions and the fourth bent portions of the second coil terminals are also ensured. Consequently, circumferential insulation distances between the first and second coil terminals are ensured, improving electrical insulation.

Because the radially outer insulating paper base portion is disposed on a radially inner side of the row of first coil terminals, and the radially outer insulating paper base portion is disposed on a radially outer side of the row of second coil terminals, radial insulation distances between the first and second coil terminals are ensured, improving electrical insulation.

Because circumferential and radial electrical insulation of the first and second coil terminals is increased in this manner, increases in voltage can be achieved in the rotary electric machine.

The radially outer and radially inner insulating papers can be mounted even in a state in which the first through fourth bent portions are formed on the first and second coil terminals of the coils that constitute the armature winding. Thus, because a holding mechanism for the radially outer and radially inner insulating papers is no longer required on the bending and twisting apparatus for the first and second coil terminals, the rotary electric machine can be manufactured using inexpensive equipment.

DESCRIPTION OF EMBODIMENTS

Preferred embodiments of a rotary electric machine according to the present invention will now be explained with reference to the drawings.

Embodiment 1

Figure 1:
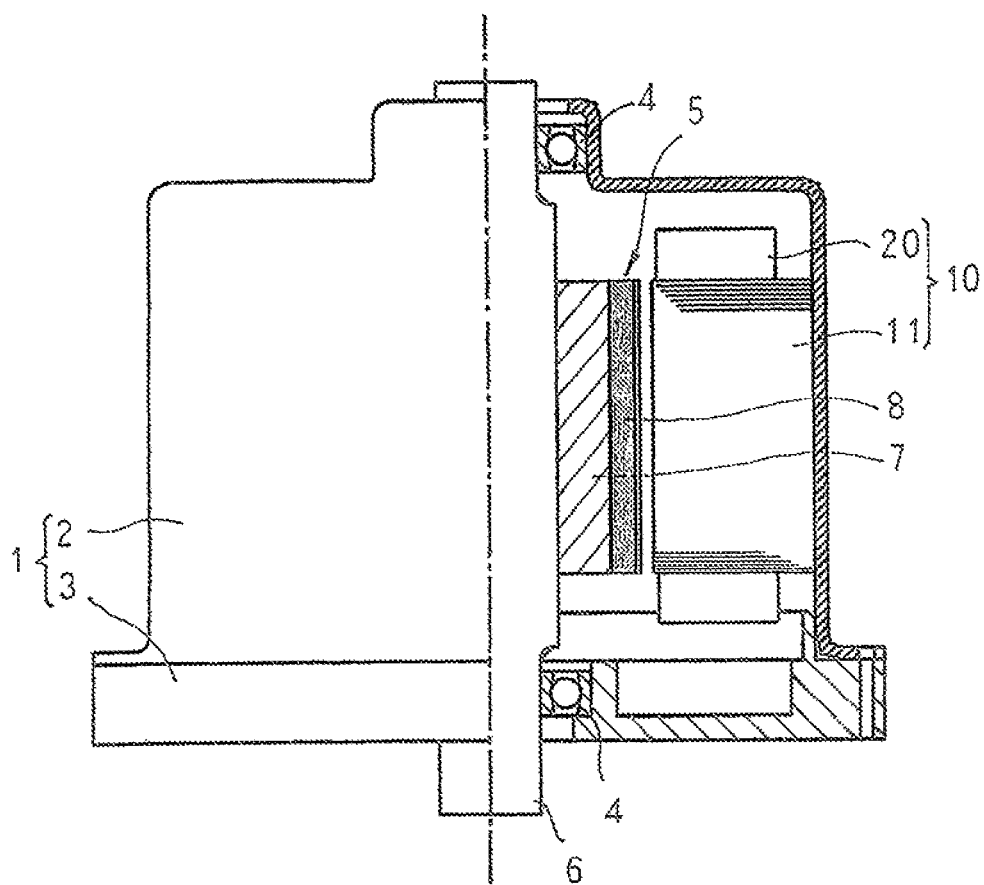
FIG. 1 is a half section that shows a rotary electric machine according to Embodiment 1 of the present invention.
Figure 2:
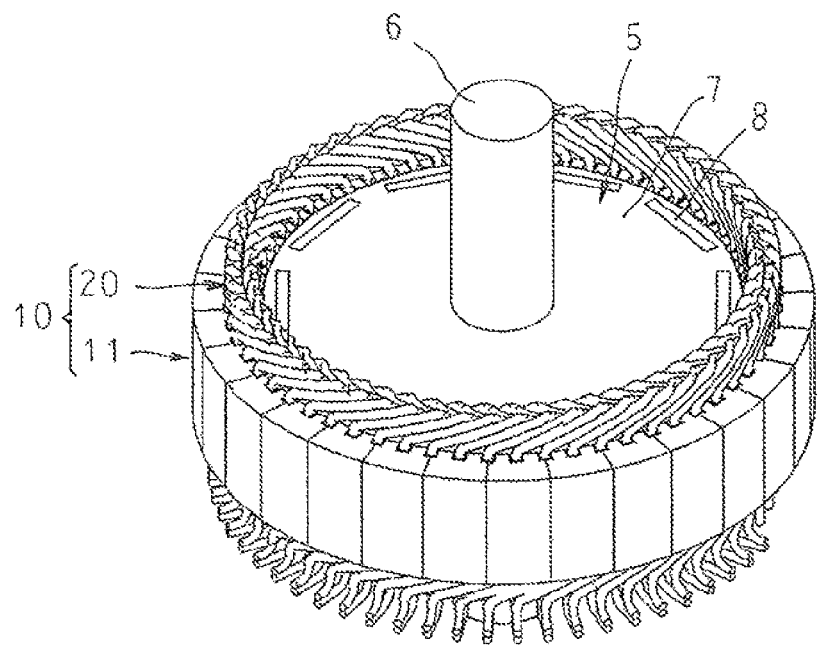
FIG. 2 is an oblique projection that shows part of the rotary electric machine according to Embodiment 1 of the present invention.
Figure 3:
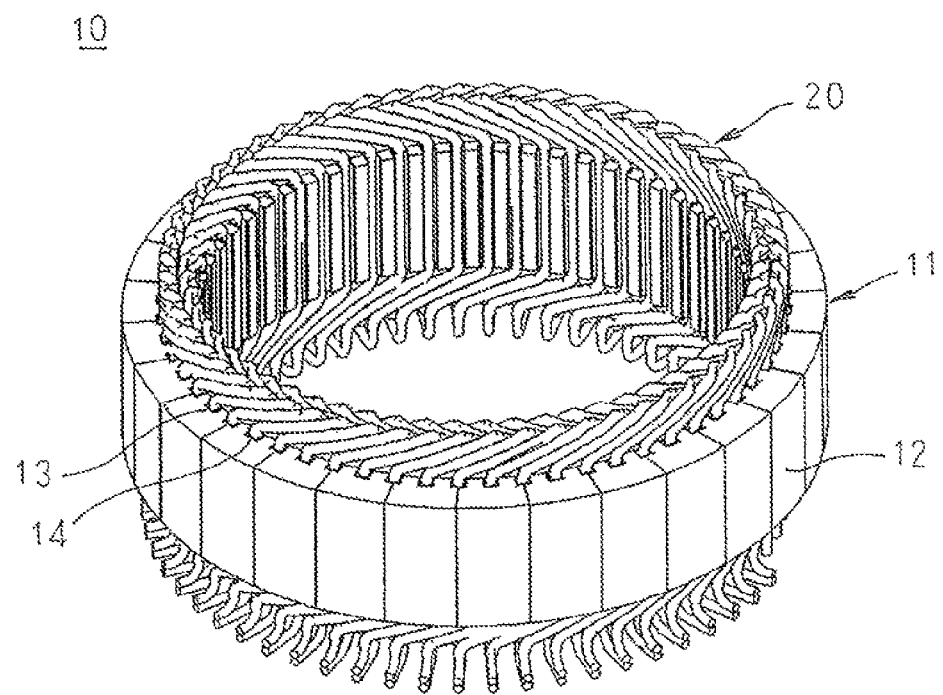
FIG. 3 is an oblique projection that shows an armature in the rotary electric machine according to Embodiment 1 of the present invention.
Figure 4:
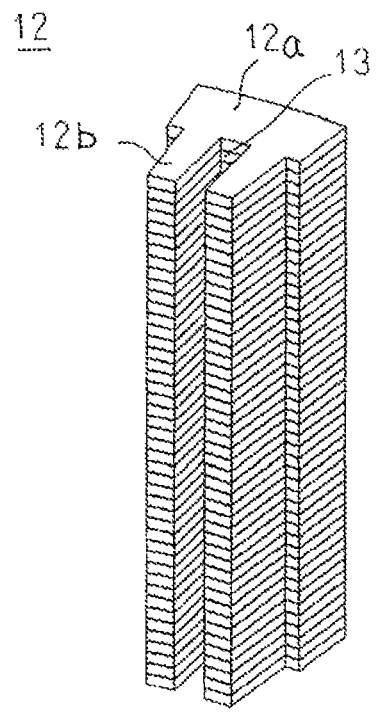
FIG. 4 is an oblique projection that shows a core block that constitutes part of an armature core in the rotary electric machine according to Embodiment 1 of the present invention.
Figure 5:
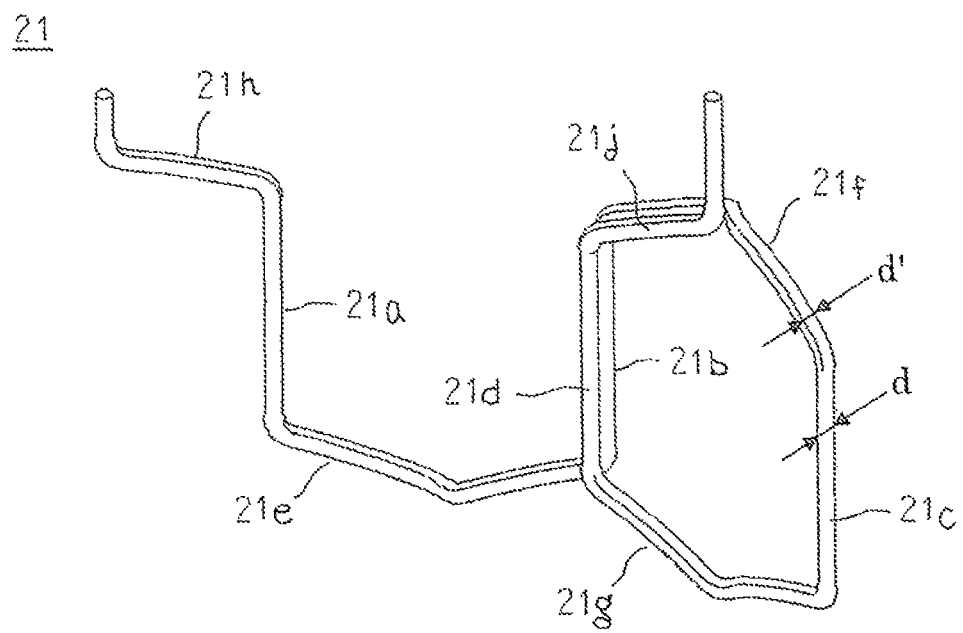
FIG. 5 is an oblique projection that shows a coil that constitutes part of an armature winding in the rotary electric machine according to Embodiment 1 of the present invention.
Figure 6:
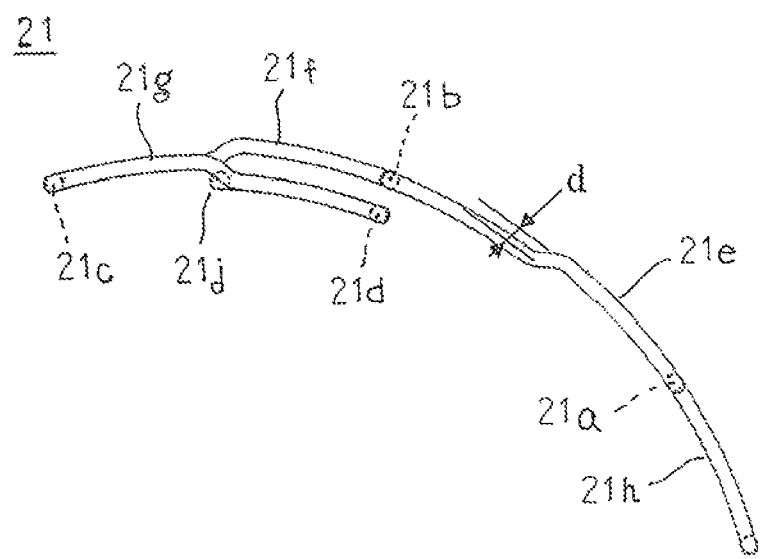
FIG. 6 is an end elevation that shows the coil that constitutes part of the armature winding in the rotary electric machine according to Embodiment 1 of the present invention viewed from a vicinity of first and third coil end portions.
Figure 7:
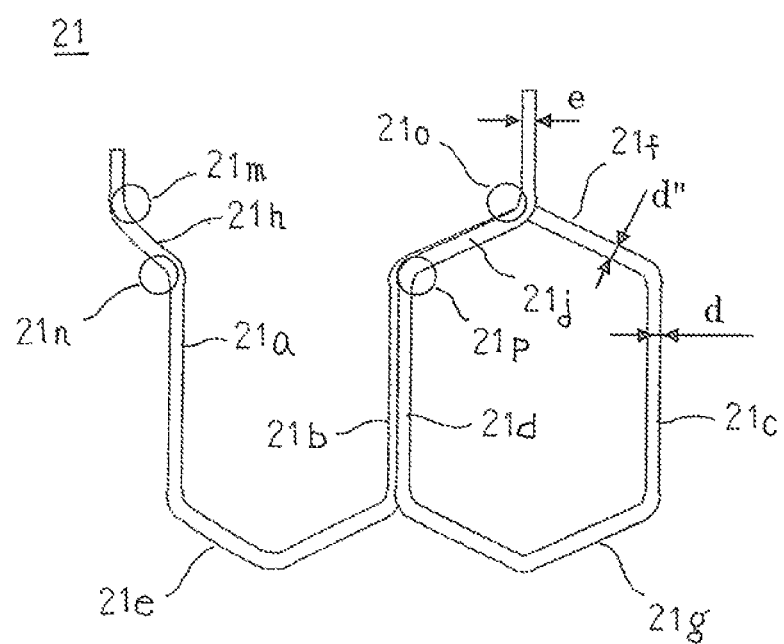
FIG. 7 is a front elevation that shows the coil that constitutes part of the armature winding in the rotary electric machine according to Embodiment 1 of the present invention.
Figure 8:
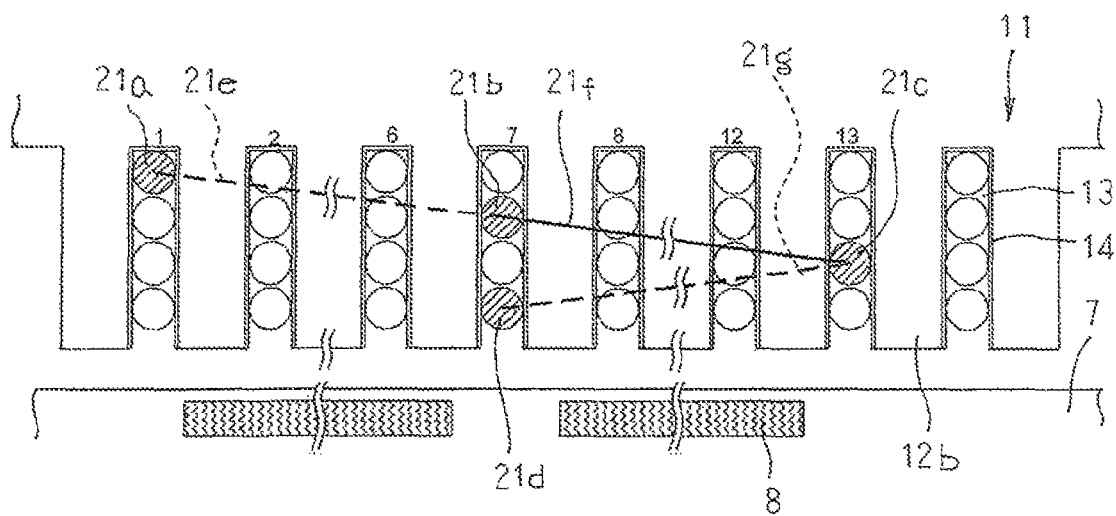
FIG. 8 is a partial cross section that schematically shows a slot-housed state of the coil that constitutes part of the armature winding in the rotary electric machine according to Embodiment 1 of the present invention.

FIG. 1 is a half section that shows a rotary electric machine according to Embodiment 1 of the present invention, FIG. 2 is an oblique projection that shows part of the rotary electric machine according to Embodiment 1 of the present invention, FIG. 3 is an oblique projection that shows an armature in the rotary electric machine according to Embodiment 1 of the present invention, FIG. 4 is an oblique projection that shows a core block that constitutes part of an armature core in the rotary electric machine according to Embodiment 1 of the present invention, FIG. 5 is an oblique projection that shows a coil that constitutes part of an armature winding in the rotary electric machine according to Embodiment 1 of the present invention, FIG. 6 is an end elevation that shows the coil that constitutes part of the armature winding in the rotary electric machine according to Embodiment 1 of the present invention viewed from a vicinity of first and third coil end portions, FIG. 7 is a front elevation that shows the coil that constitutes part of the armature winding in the rotary electric machine according to Embodiment 1 of the present invention, and FIG. 8 is a partial cross section that schematically shows a slot-housed state of the coil that constitutes part of the armature winding in the rotary electric machine according to Embodiment 1 of the present invention.

In FIGS. 1 and 2, a rotary electric machine 100 includes: a housing 1 that has: a floored cylindrical frame 2; and an end plate 3 that closes an opening of the frame 2; an armature 10 that is fixed to a cylindrical portion of the frame 2 in an internally fitted state; and a rotor 5 that is fixed to a rotating shaft 6 that is rotatably supported in a floor portion of the frame 2 and the end plate 3 by means of bearings 4 so as to be rotatably disposed on an inner circumferential side of the armature 10.

The rotor 5 is a permanent-magnet rotor that includes: a rotor core 7 that is fixed to the rotating shaft 6, which is inserted through a central position thereof; and permanent magnets 8 that are embedded in a vicinity of an outer circumferential surface of the rotor core 7 so as to be arranged at a uniform pitch circumferentially to constitute magnetic poles. Moreover, the rotor 5 is not limited to a permanent-magnet rotor, and a squirrel-cage rotor in which uninsulated rotor conductors are housed in slots of a rotor core such that two sides are shorted by a shorting ring, or a wound rotor in which insulated conductor wires are mounted into slots of a rotor core, etc., may be used.

Next, configuration of the armature 10 will be explained in detail with reference to FIGS. 3 through 8.

As shown in FIG. 3, the armature 10 includes: an armature core 11; an armature winding 20 that is mounted to the armature core 11; and slot cells 14 that are mounted into slots 13 of the armature core 11. The armature winding 20 is configured by connecting a plurality of coils 21 that are mounted into the armature core 11. The slot cells 14 are formed into angular C shapes by bending and shaping oblong sheets that are produced by sandwiching a polyimide film between meta-aramid fibers, for example, and are inserted into the slots 13 to isolate the armature core 11 and the armature winding 20 electrically.

Here, to facilitate explanation, the number of poles in the rotor 5 is ten, the number of slots in the armature core 11 is sixty, and the armature winding 20 is a three-phase winding. In other words, the slots 13 are formed on the armature core 11 at a ratio of two slots per phase per pole.

As shown in FIG. 4, core blocks 12 are made by dividing the annular armature core 11 into thirty equal sections circumferentially, and include: a core back portion 12a that has a circular arc-shaped cross section, that is produced by laminating and integrating a plurality of electromagnetic steel sheets; and two teeth 12b that are disposed so as to protrude radially inward from an inner circumferential wall surface of the core back portion 12a. The armature core 11 is configured into an annular shape by arranging and integrating thirty core blocks 12 circumferentially by butting together circumferential side surfaces of the core back portions 12a such that the teeth 12b are oriented radially inward. The slots 13, which are formed by circumferentially adjacent core blocks 12, are arranged at a uniform angular pitch circumferentially so as to be open on an inner circumferential side. The teeth 12b are formed so as to have a tapered shape in which a circumferential width becomes gradually narrower radially inward, and a cross section of the slots 13 that is perpendicular to an axial direction of the armature core 11 is oblong.

As shown in FIGS. 5 through 7, a coil 21 that constitutes part of the armature winding 20 is produced by winding a conductor wire that has a circular cross section that has a diameter d, and that is made of jointless continuous copper wire or aluminum wire that is coated with an insulating enamel resin, for example, into a 5 shape. Moreover, the coil 21 may alternatively be produced using a conductor wire that has a rectangular cross section.

The coils 21 include: first, second, third, and fourth rectilinear portions 21a, 21b, 21c, and 21d that form three rows so as to be at an angular spacing of six slots apart; a first coil end portion 21e that links second longitudinal ends of the first and second rectilinear portions 21a and 21b to each other; a second coil end portion 21f that links first longitudinal ends of the second and third rectilinear portions 21b and 21c to each other; a third coil end portion 21g that links second longitudinal ends of the third and fourth rectilinear portions 21c and 21d to each other; a first coil terminal 21h that extends from a first longitudinal end of the first rectilinear portion 21a; and a second coil terminal 21j that extends from a first longitudinal end of the fourth rectilinear portion 21d. Moreover, an angular spacing of six slots is a pitch between slot centers of slots 13 that are positioned on two sides of six circumferentially consecutive teeth 12b, and corresponds to a pitch of one magnetic pole.

Construction of the coil 21 will now be explained in detail using FIGS. 5 through 8. Moreover, for simplicity, housed positions of the conductor wires that are housed inside the slots 13 are designated a first layer, a second layer, a third layer, and a fourth layer from a radially inner side in FIG. 8. In FIGS. 8, 1, 2, etc., through, 12, and 13 are slot numbers that are allotted to the slots 13 sequentially in a circumferential direction. Furthermore, in FIG. 8, the first through third coil end portions 21e, 21f, and 21g are depicted as straight lines for simplicity.

The first rectilinear portion 21a is housed in the first layer inside the slots 13 at Slot Number 1, the second and fourth rectilinear portions 21b and 21d are housed in the second layer and the fourth layer inside the slots 13 at Slot Number 7, and the third rectilinear portion 21c is housed in the third layer inside the slots 13 at Slot Number 13. In other words, the first, second, third, and fourth rectilinear portions 21a, 21b, 21c, and 21d are arranged in three columns so as to be separated by an angular spacing of six slots.

The first coil end portion 21e that extends outward at the second axial end of the armature core 11 from the first layer inside the slots 13 at Slot Number 1 maintains its radial position and extends at a constant inclination in the first circumferential direction and axially outward, is displaced by d radially inward at a central portion (a top portion), and subsequently maintains its radial position and extends at a reverse inclination in the first circumferential direction and axially inward to enter the second layer inside the slots 13 at Slot Number 7.

The second coil end portion 21f that extends outward at the first axial end of the armature core 11 from the second layer inside the slots 13 at Slot Number 7 maintains its radial position and extends at a constant inclination in the first circumferential direction and axially outward, is displaced by d radially inward at a central portion (a top portion), and subsequently maintains its radial position and extends at a reverse inclination in the first circumferential direction and axially inward to enter the third layer inside the slots 13 at Slot Number 13.

The third coil end portion 21g that extends outward at the second axial end of the armature core 11 from the third layer inside the slots 13 at Slot Number 13 maintains its radial position and extends at a constant inclination in the second circumferential direction and axially outward, is displaced by d radially inward at a central portion (a top portion), and subsequently maintains its radial position and extends at a reverse inclination in the second circumferential direction and axially inward to enter the fourth layer inside the slots 13 at Slot Number 7.

Thus, the first through third coil end portions 21e, 21f, and 21g have crank portions that displace radially by the radial width d of the conductor wires at top portions. The first through third coil end portions 21e, 21f, and 21g and the first and second coil terminals 21h and 21j are formed by radially crushing conductor wire that has a circular cross section so as to have a cross-sectional shape that has a radial thickness d', where d'<d, and an axial thickness d", where d">d.

The first coil terminal 21h that extends outward from the first layer inside the slots 13 at Slot Number 1 at the first axial end of the armature core 11 is bent at a first bent portion 21n, maintains its radial position, extends in the second circumferential direction and axially outward at a constant inclination, and is subsequently bent so as to be parallel to an axial direction of the armature core 11 at a second bent portion 21m to project axially outward.

The second coil terminal 21j that extends outward from the fourth layer inside the slots 13 at Slot Number 7 at the first axial end of the armature core 11 is bent at a third bent portion 21p, maintains its radial position, extends in the first circumferential direction and axially outward at a constant inclination, and is subsequently bent so as to be parallel to an axial direction of the armature core 11 at a fourth bent portion 21o to project axially outward.

The first and second coil terminals 21h and 21j are connected to other coils 21, to electric power supplying portions, and to a neutral point in a vicinity of tip ends of the second and fourth bent portions 21m and 21o. Thus, an insulating coating is peeled off a vicinity of the tip ends of the second and fourth bent portions 21m and 21o of the first and second coil terminals 21h and 21j, and a circumferential width thereof is e, where e<d".

Figure 9:
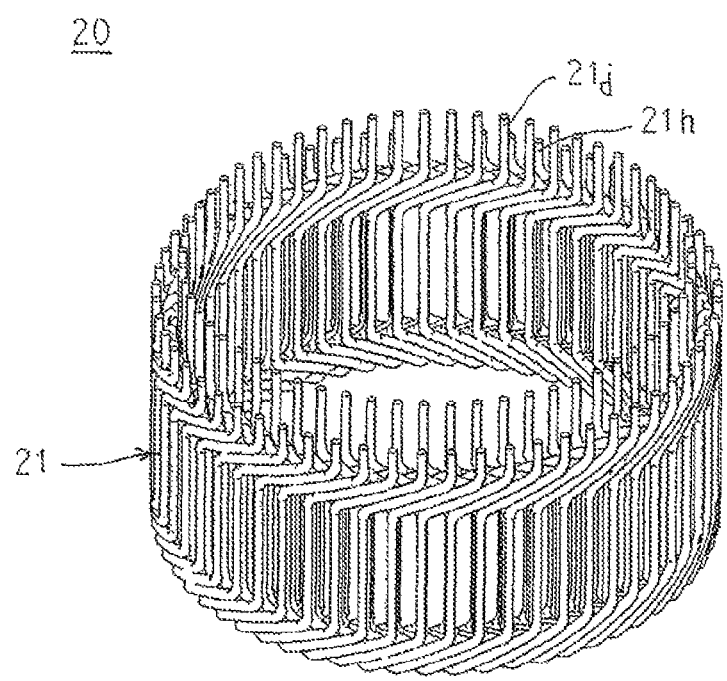
FIG. 9 is an oblique projection that shows the armature winding in the rotary electric machine according to Embodiment 1 of the present invention.
Figure 10:
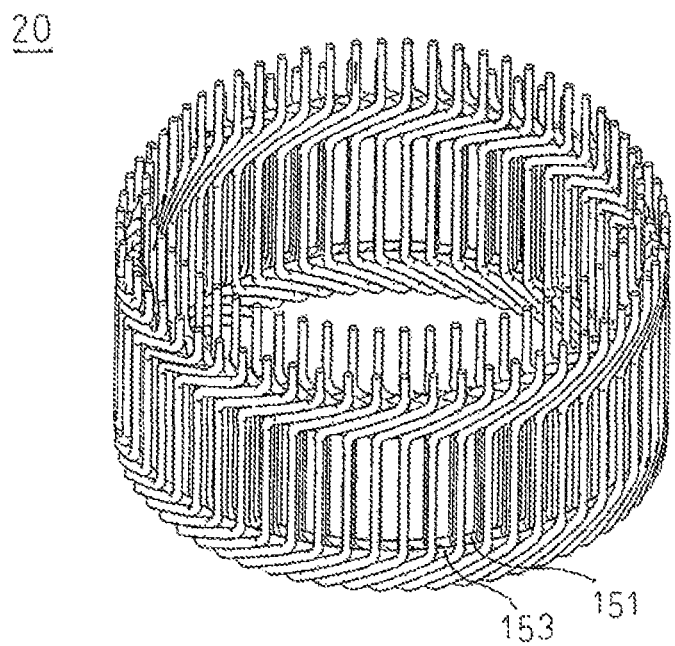
FIG. 10 is an oblique projection that shows a mounted state of insulating papers inside coil ends of the armature winding in the rotary electric machine according to Embodiment 1 of the present invention.
Figure 11:
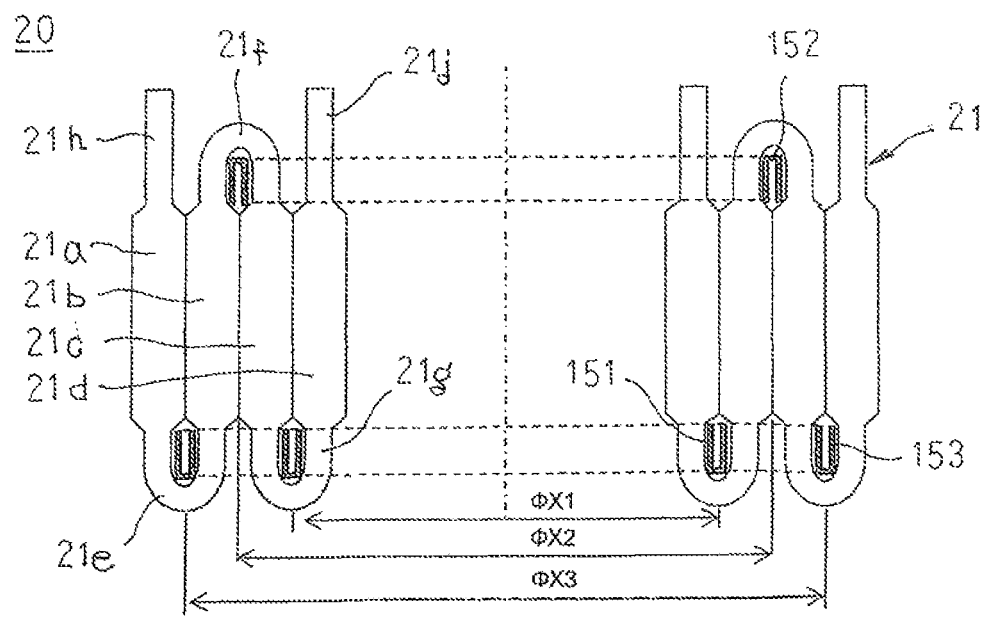
FIG. 11 is a cross section that schematically shows the mounted state of the insulating papers inside the coil ends of the armature winding in the rotary electric machine according to Embodiment 1 of the present invention.
Figure 12:
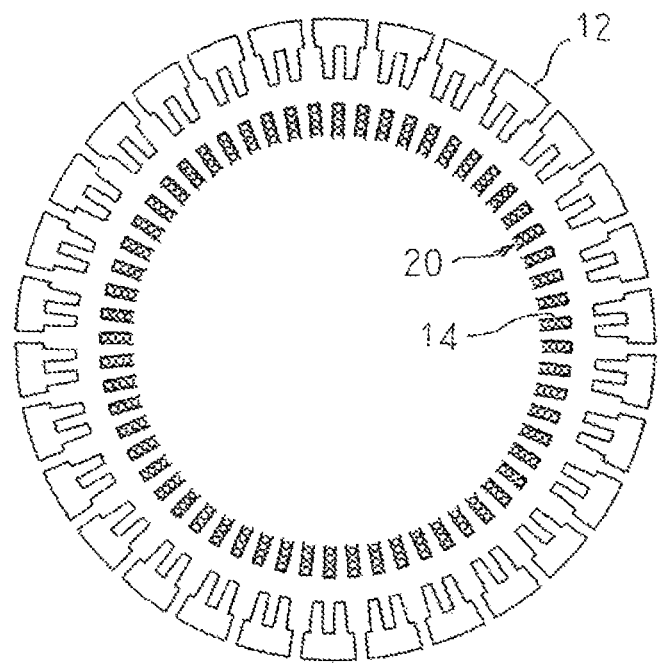
FIG. 12 is a diagram that explains a method for mounting core blocks to the armature winding in the rotary electric machine according to Embodiment 1 of the present invention.
Figure 13:
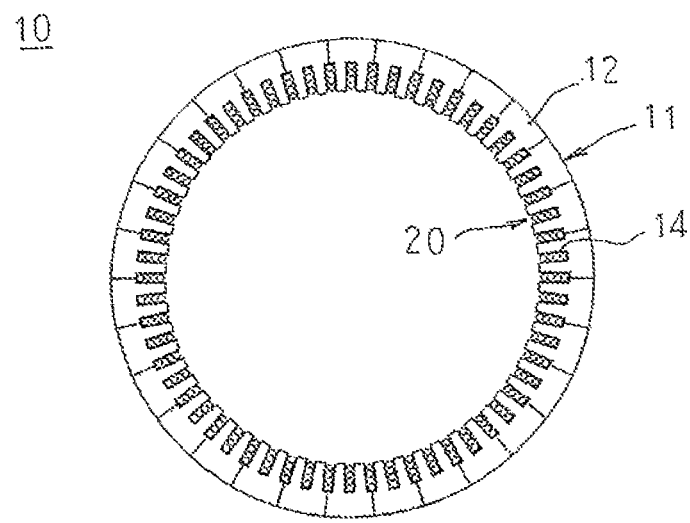
FIG. 13 is a diagram that explains a state in which the core blocks are mounted to the armature winding in the rotary electric machine according to Embodiment 1 of the present invention.
Figure 14:
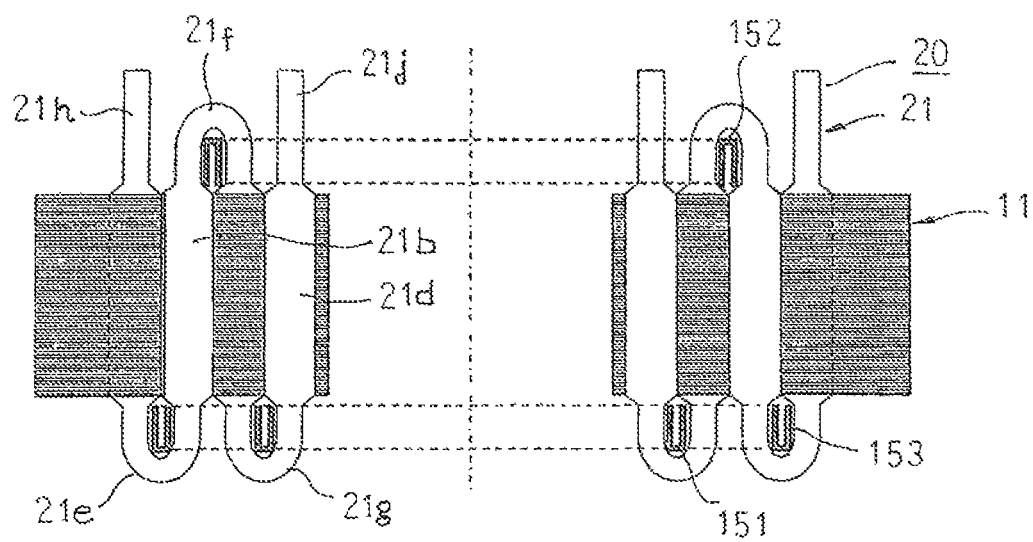
FIG. 14 is a cross section that schematically shows the state in which the core blocks are mounted to the armature winding in the rotary electric machine according to Embodiment 1 of the present invention.
Figure 15:
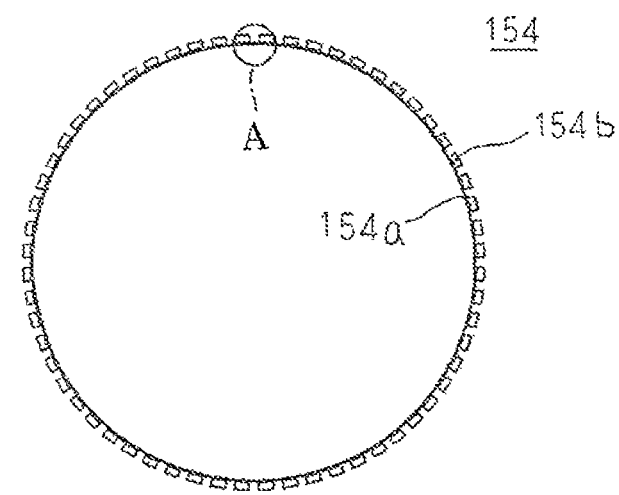
FIG. 15 is a front elevation that shows a radially outer insulating paper in the rotary electric machine according to Embodiment 1 of the present invention.
Figure 16:
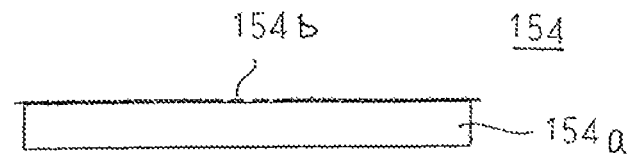
FIG. 16 is a side elevation that shows the radially outer insulating paper in the rotary electric machine according to Embodiment 1 of the present invention.
Figure 17:
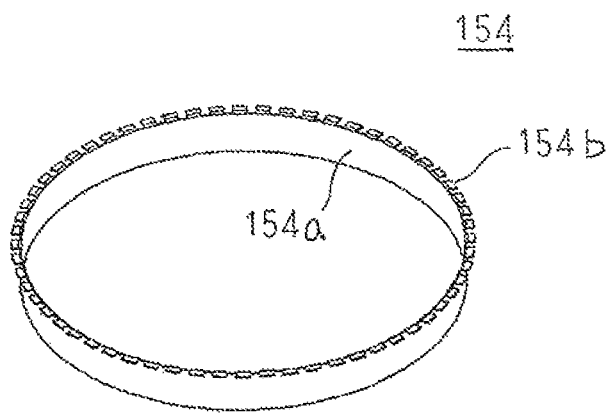
FIG. 17 is an oblique projection that shows the radially outer insulating paper in the rotary electric machine according to Embodiment 1 of the present invention.
Figure 18:
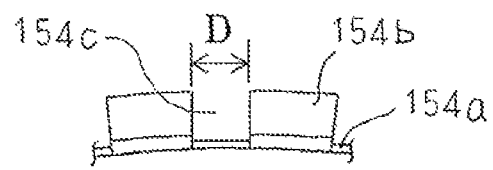
FIG. 18 is an enlargement of Portion A in FIG. 15.
Figure 19:
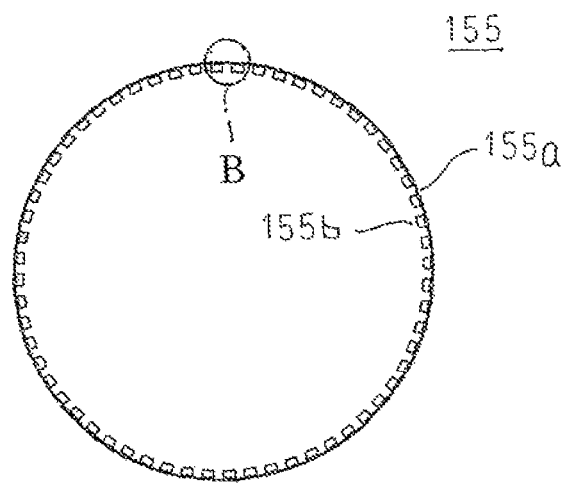
FIG. 19 is a front elevation that shows a radially inner insulating paper in the rotary electric machine according to Embodiment 1 of the present invention.
Figure 20:
FIG. 20 is a side elevation that shows the radially inner insulating paper in the rotary electric machine according to Embodiment 1 of the present invention.
Figure 21:
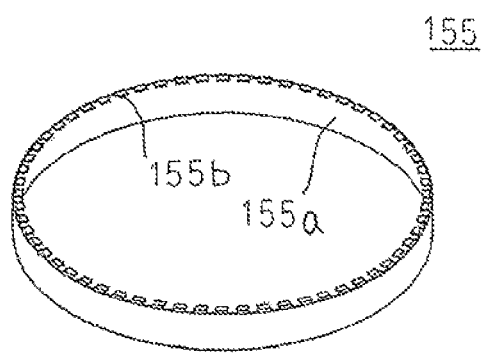
FIG. 21 is an oblique projection that shows the radially inner insulating paper in the rotary electric machine according to Embodiment 1 of the present invention.
Figure 22:
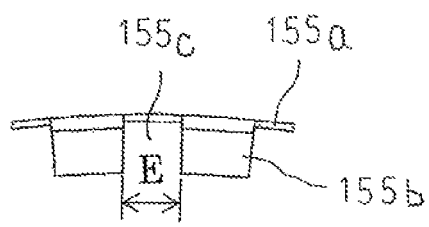
FIG. 22 is an enlargement of Portion B in FIG. 19.
Figure 23:
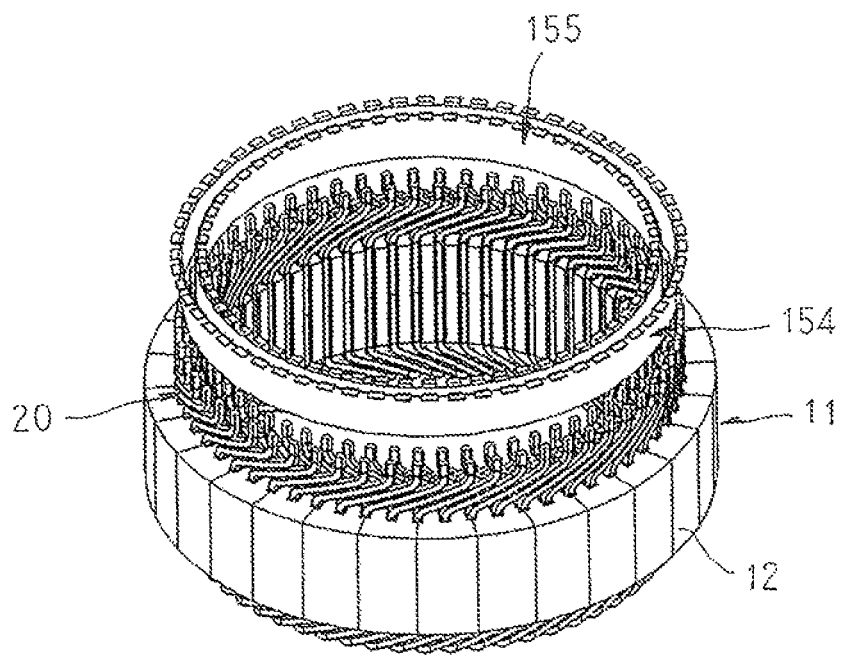
FIG. 23 is an oblique projection that explains a method for mounting the radially outer and radially inner insulating papers to the armature winding of the armature in the rotary electric machine according to Embodiment 1 of the present invention.
Figure 24:
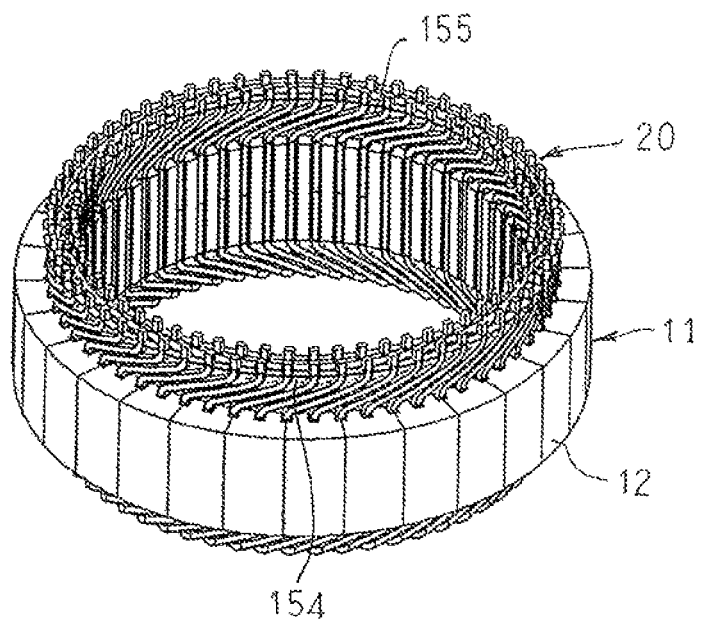
FIG. 24 is an oblique projection that shows the armature to which the radially outer and radially inner insulating papers are mounted in the rotary electric machine according to Embodiment 1 of the present invention.
Figure 25:
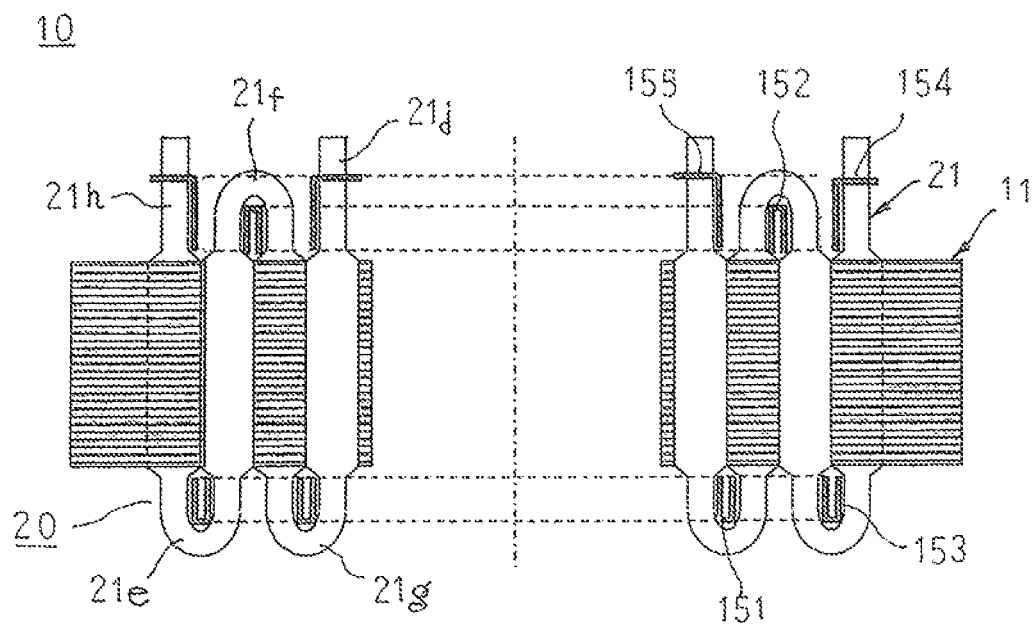
FIG. 25 is a cross section that schematically shows an armature in the rotary electric machine according to Embodiment 1 of the present invention.
Figure 26:
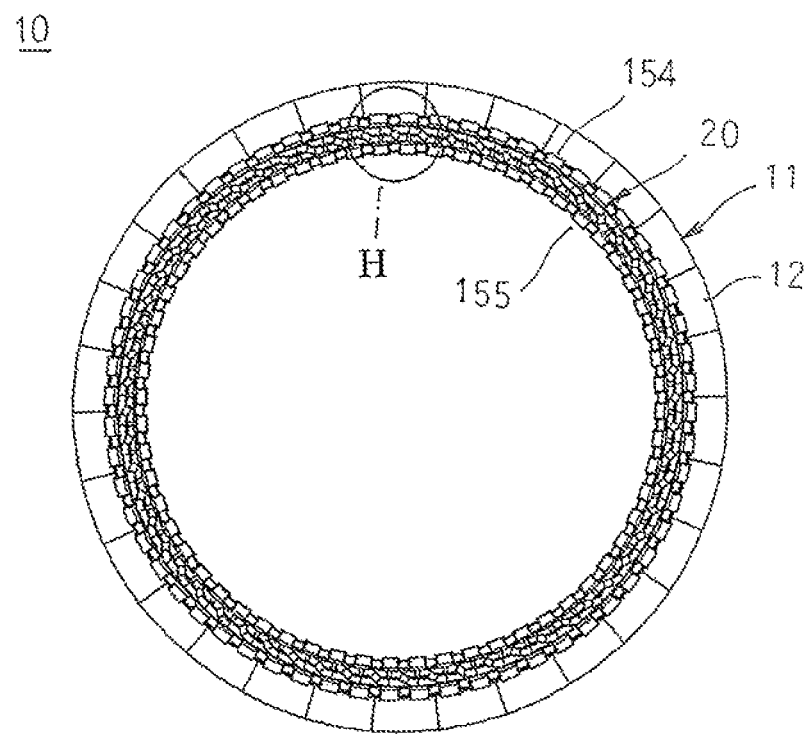
FIG. 26 is an end elevation that shows the armature to which the radially outer and radially inner insulating papers are mounted in the rotary electric machine according to Embodiment 1 of the present invention when viewed from a vicinity of a first axial end.
Figure 27:
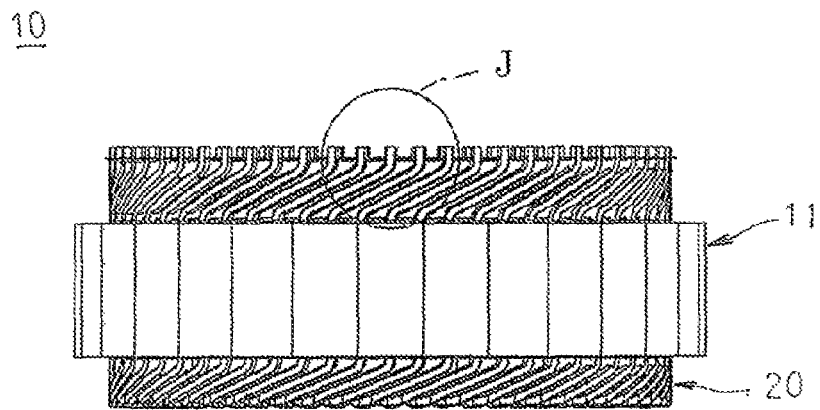
FIG. 27 is a side elevation that shows the armature to which the radially outer and radially inner insulating papers are mounted, in the rotary electric machine according to Embodiment 1 of the present invention.
Figure 28:
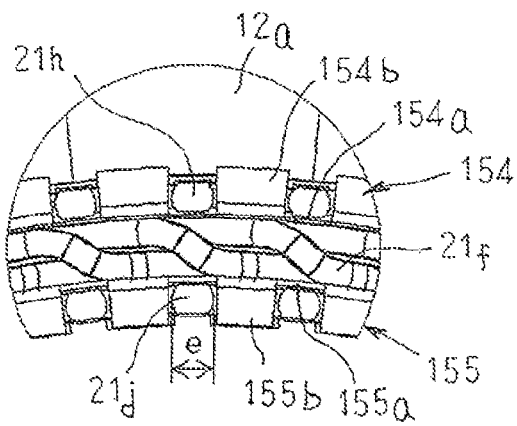
FIG. 28 is an enlargement of Portion H in FIG. 26.
Figure 29:
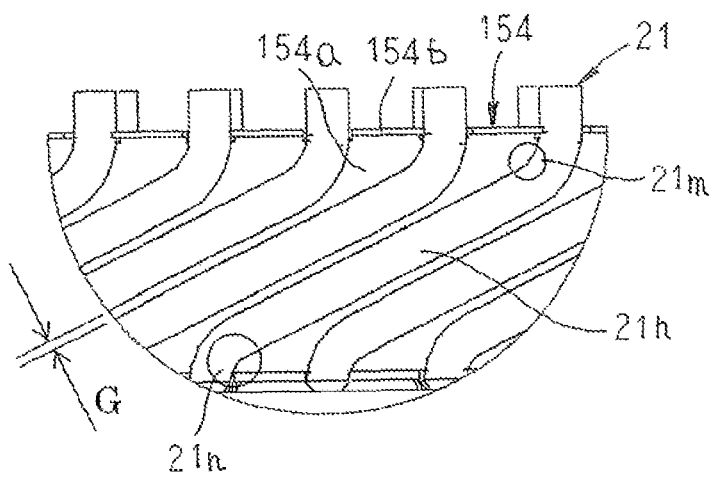
FIG. 29 is an enlargement of Portion J in FIG. 27.

Next, a manufacturing method for the armature 10 will be explained using FIGS. 9 through 29. FIG. 9 is an oblique projection that shows the armature winding in the rotary electric machine according to Embodiment 1 of the present invention, FIG. 10 is an oblique projection that shows a mounted state of insulating papers inside coil ends of the armature winding in the rotary electric machine according to Embodiment 1 of the present invention, FIG. 11 is a cross section that schematically shows the mounted state of the insulating papers inside the coil ends of the armature winding in the rotary electric machine according to Embodiment 1 of the present invention, FIG. 12 is a diagram that explains a method for mounting core blocks to the armature winding in the rotary electric machine according to Embodiment 1 of the present invention, FIG. 13 is a diagram that explains a state in which the core blocks are mounted to the armature winding in the rotary electric machine according to Embodiment 1 of the present invention, FIG. 14 is a cross section that schematically shows the state in which the core blocks are mounted to the armature winding in the rotary electric machine according to Embodiment 1 of the present invention, FIG. 15 is a front elevation that shows a radially outer insulating paper in the rotary electric machine according to Embodiment 1 of the present invention, FIG. 16 is a side elevation that shows the radially outer insulating paper in the rotary electric machine according to Embodiment 1 of the present invention, FIG. 17 is an oblique projection that shows the radially outer insulating paper in the rotary electric machine according to Embodiment 1 of the present invention, FIG. 18 is an enlargement of Portion A in FIG. 15, FIG. 19 is a front elevation that shows a radially inner insulating paper in the rotary electric machine according to Embodiment 1 of the present invention, FIG. 20 is a side elevation that shows the radially inner insulating paper in the rotary electric machine according to Embodiment 1 of the present invention, FIG. 21 is an oblique projection that shows the radially inner insulating paper in the rotary electric machine according to Embodiment 1 of the present invention, FIG. 22 is an enlargement of Portion B in FIG. 19, FIG. 23 is an oblique projection that explains a method for mounting the radially outer and radially inner insulating papers to the armature winding of the armature in the rotary electric machine according to Embodiment 1 of the present invention, FIG. 24 is an oblique projection that shows the armature to which the radially outer and radially inner insulating papers are mounted in the rotary electric machine according to Embodiment 1 of the present invention, FIG. 25 is a cross section that schematically shows an armature in the rotary electric machine according to Embodiment 1 of the present invention, FIG. 26 is an end elevation that shows the armature to which the radially outer and radially inner insulating papers are mounted in the rotary electric machine according to Embodiment 1 of the present invention when viewed from a vicinity of a first axial end, FIG. 27 is a side elevation that shows the armature to which the radially outer and radially inner insulating papers are mounted, in the rotary electric machine according to Embodiment 1 of the present invention, FIG. 28 is an enlargement of Portion H in FIG. 26, and FIG. 29 is an enlargement of Portion J in FIG. 27. Moreover, in FIGS. 12 and 13, the armature winding 20 is represented using only the first through fourth rectilinear portions 21a, 21b, 21c, and 21d for convenience.

Coils without bent portions (not shown) on which the first through fourth bent portions 21n, 21m, 21p, and 21o are not formed are first produced. In these coils without bent portions, the first coil terminal 21h protrudes in the longitudinal direction of the first rectilinear portion 21a, and the second coil terminal 21j protrudes in the longitudinal direction of the fourth rectilinear portion 21d.

Next, sixty coils without bent portions are arranged circumferentially at a pitch of one slot, to produce a winding assembly (not shown). At a first axial end of the winding assembly that is produced in this manner, the second coil end portions 21f are arranged in a single row at a pitch of one slot in a circumferential direction. The first coil terminals 21h are arranged in a single row at a pitch of one slot in a circumferential direction on a radially outer side of the row of second coil end portions 21f. The second coil terminals 21j are arranged in a single row at a pitch of one slot in a circumferential direction on a radially inner side of the row of second coil end portions 21f.

At a second axial end of the winding assembly that is produced in this manner, the first coil end portions 21e are arranged in a single row at a pitch of one slot in a circumferential direction. The third coil end portions 21g are arranged in a single row at a pitch of one slot in a circumferential direction on a radially inner side of the row of first coil end portions 21e. In this manner, the row of first coil end portions 21e and the row of third coil end portions 21g line up in two layers in a radial direction at the second axial end of the winding assembly.

Next, the first coil terminals 21h that are arranged circumferentially are twisted in a second circumferential direction using a bending and twisting jig (not shown), to form the first bent portion 21n and the second bent portion 21m on the first coil terminals 21h. Similarly, the second coil terminals 21j that are arranged circumferentially are twisted in a first circumferential direction using a bending and twisting jig, to form the third bent portion 21p and the fourth bent portion 21o on the second coil terminals 21j. The armature winding 20 that is shown in FIG. 9 is produced thereby. Moreover, the winding assembly is configured in an identical manner to the armature winding 20 except that the first through fourth bend portions 21n, 21m, 21p, and 21o are not formed thereon.

Next, a first insulating paper 151 that is produced so as to have an annular shape is passed between the first rectilinear portions 21a and the second rectilinear portions 21b from a vicinity of a first axial end of the armature winding 20 and inserted into the first coil end portions 21e. Similarly, a third insulating paper 153 that is produced so as to have an annular shape is passed between the third rectilinear portions 21c and the fourth rectilinear portions 21d from a vicinity of a first axial end of the armature winding 20 and inserted into the third coil end portions 21g. In addition, a second insulating paper 152 that is produced so as to have an annular shape is passed between the second rectilinear portions 21b and the third rectilinear portions 21c from a vicinity of a second axial end of the armature winding 20 and inserted into the second coil end portions 21f. The first through third insulating papers 151, 152, and 153 are mounted into the armature winding 20 in this manner, as shown in FIGS. 10 and 11.

Here, the first through third insulating papers 151, 152, and 153 are configured by bending rectangular strip-shaped bodies that are cut out of a sheet material that is made of a polyimide, polyethylene terephthalate (PET), or polyphenylene sulfide (PPS), so as to fold them in half at a middle of a short side thereof, and then curving them into annular shapes. Average diameters of the first through third insulating papers 151, 152, and 153 that are mounted to the armature winding 20 are ΦX1, ΦX2, and ΦX3.

Next, the slot cells 14 are mounted onto each of the columns of the first through fourth rectilinear portions 21a, 21b, 21c, and 21d of the armature winding 20. Next, the thirty core blocks 12 are arranged at a uniform angular pitch circumferentially such that the respective teeth 12b are positioned on a radially outer side between the columns of adjacent first through fourth rectilinear portions 21a, 21b, 21c, and 21d, as shown in FIG. 12. Next, the core blocks 12 that are arranged circumferentially are moved radially inward. The respective teeth 12b of the core blocks 12 are thereby inserted between the adjacent columns of first through fourth rectilinear portions 21a, 21b, 21c, and 21d.

Then, when the core blocks 12 that are arranged circumferentially are moved further radially inward, the circumferential side surfaces of the core back portions 12a of the adjacent core blocks 12 are butted together, preventing radially inward movement of the core blocks 12. The armature winding 20 is thereby mounted onto the armature core 11, as shown in FIGS. 13 and 14.

Next, as shown in FIG. 23, a radially outer insulating paper 154 that is produced so as to have an annular shape is inserted between the row of first coil terminals 21h and the row of second coil end portions 21f from a vicinity of the first axial end of the armature winding 20. Similarly, a radially inner insulating paper 155 that is produced so as to have an annular shape is inserted between the row of second coil terminals 21j and the row of second coil end portions 21f from a vicinity of the first axial end of the armature winding 20. The radially outer and radially inner insulating papers 154 and 155 are mounted into the armature winding 20 in this manner, as shown in FIGS. 24 through 27. Next, connection processes are applied to the first and second coil terminals 21h and 21j such that the first and second coil terminals 21h and 21j are connected to other coils 21, to electric power supplying portions, and to a neutral point in a vicinity of tip ends of the second and fourth bent portions 21m and 21o.

Here, as shown in FIGS. 15 through 18, the radially outer insulating paper 154 includes: an annular base portion 154a that has a constant width; sixty protruding portions 154b that are arranged circumferentially so as to each protrude radially outward from a first end edge of the base portion 154a so as to be separated by a distance D from each other; and slits 154c that are formed between adjacent protruding portions 154b. Similarly, as shown in FIGS. 19 through 22, the radially inner insulating paper 155 includes: an annular base portion 155a that has a constant width; sixty protruding portions 155b that are arranged circumferentially so as to each protrude radially inward from a first end edge of the base portion 155a so as to be separated by a distance E from each other; and slits 155c that are formed between adjacent protruding portions 155b.

Moreover, the radially outer and radially inner insulating papers 154 and 155 are produced using an insulating sheet material that is made of a polyimide, polyethylene terephthalate (PET), or polyphenylene sulfide (PPS). The base portions 154a and 155a are produced by curving strip-shaped insulating sheets into annular shapes, the strip-shaped insulating sheets being cut out of the insulating sheet material, and the protruding portions 154b and 155b are produced by bending the protruding portions that protrude from the base portions 154a and 155a at root portions thereof. From a viewpoint of increasing the mountability of the radially outer and radially inner insulating papers 154 and 155, it is desirable for the width D of the slits 154c and the width E of the slits 155c to be greater than or equal to the width e at the tip end portions of the first and second coil terminals 21h and 21j. Here, the base portion 154a is a radially outer insulating paper base portion, the protruding portions 154b are radially outer insulating paper protruding portions, the base portion 155a is a radially inner insulating paper base portion, and the protruding portions 155b are radially inner insulating paper protruding portions.

As shown in FIGS. 28 and 29, the protruding portions 154b of the radially outer insulating paper 154 are inserted between tip end portions of adjacent first coil terminals 21h axially further outward than the second bent portions 21m, and the base portion 154a is positioned between the row of first coil terminals 21h and the row of second coil end portions 21f. The protruding portions 155b of the radially inner insulating paper 155 are inserted between tip end portions of adjacent second coil terminals 21j axially further outward than the fourth bent portions 21o, and the base portions 155a is positioned between the row of second coil terminals 21j and the row of second coil end portions 21f.

According to Embodiment 1, a radially outer insulating paper 154 includes: an annular base portion 154a that is disposed between a row of first coil terminals 21h and a row of second coil end portions 21f; and protruding portions 154b that each protrude radially outward from an axially outer end portion of the base portion 154a and that are inserted between tip end portions of adjacent first coil terminals 21h axially further outward than second bent portions 21m. Similarly, a radially inner insulating paper 155 includes: an annular base portion 155a that is disposed between a row of second coil terminals 21j and the row of second coil end portions 21f; and protruding portions 155b that each protrude radially inward from an axially outer end portion of the base portion 155a and that are inserted between tip end portions of adjacent second coil terminals 21j axially further outward than fourth bent portions 21o.

The radially outer and radially inner insulating papers 154 and 155 can thereby be mounted to the armature winding 20 from a vicinity of a first axial end after the first and third bent portions 21n and 22p and the second and fourth bent portions 21m and 21o are formed on the first and second coil terminals 21h and 21j of the coils without bent portions that are mounted to the armature core 11 using a bending and twisting jig.

Consequently, flexural stresses due to the step of bending and twisting the first and second coil terminals 21h and 21j do not act on the radially outer and radially inner insulating papers 154 and 155. Thus, linking portions between the protruding portions 154b and 155b and the base portions 154a and 155a will not be damaged, and nor will the base portions 154a and 155a deform, due to the radially outer and radially inner insulating papers 154 and 155 being twisted, thereby improving the electrical insulation, and enabling the rotary electric machine 100 to be applied to applications in which they will be used at high voltages.

Furthermore, if the radially protruding portions 154b and 155b were axially further inward than the second bent portions 21*m* and the fourth bent portions 21*o*, for example, then the protruding portions 154*b* and 155*b* would interfere with the second bent portions 21*m* and the fourth bent portions 21*o* unless the radially outer and radially inner insulating papers 154 and 155 were turned in a circumferential direction while being inserted axially. According to the present invention, because the radially protruding portions 154*b* and 155*b* are axially further outward than the second bent portions 21*m* and the fourth bent portions 21*o*, the radially outer and radially inner insulating papers 154 and 155 can be inserted without the protruding portions 154*b* and 155*b* interfering with the second bent portions 21*m* and the fourth bent portions 21*o* simply by moving them in a straight line in an axial direction, effectively enabling manufacture to be made inexpensive.

A mechanism for holding and positioning the radially outer and radially inner insulating papers 154 and 155 is no longer required on the bending and twisting apparatus of the first and second coil terminals 21*h* and 21*j* when the first and third bent portions 21*n* and 22*p* and the second and fourth bent portions 21*m* and 21*o* are formed on the first and second coil terminals 21*h* and 21*j* of the coils without bent portions that are mounted to the armature core 11, enabling reductions in equipment cost to be achieved.

The protruding portions 154*b* are inserted between the tip end portions of the adjacent first coil terminals 21*h* axially further outward than the second bent portions 21*m*. Thus, circumferential movement of the radially outer insulating paper 154 is restricted by the protruding portions 154*b* contacting a vicinity of the tip ends of the first coil terminals 21*h*. Movement toward the armature core 11, i.e., axially inward movement, is also restricted by the protruding portions 154*b* contacting the second bent portions 21*m* of the first coil terminals 21*h*. Circumferential movement and axial movement of the radially outer insulating paper 154 are thereby restricted. Similarly, because the protruding portions 155*b* are inserted between the tip end portions of adjacent second coil terminals 21*j* axially further outward than the fourth bent portions 21*o*, circumferential movement and axial movement of the radially inner insulating paper 155 are restricted. Consequently, a holding mechanism is no longer required for the radially outer and radially inner insulating papers 154 and 155 in the process of connecting the first and second coil terminals 21*h* and 21*j*, enabling reductions in equipment cost to be achieved, and also increasing productivity.

Because the protruding portions 154*b* and 155*b* are inserted between the tip end portions of adjacent first and second coil terminals 21*h* and 21*j*, gaps between the tip end portions of the first and second coil terminals 21*h* and 21*j* can be maintained at a circumferential width of the protruding portions 154*b* and 155*b*. Consequently, as shown in FIG. 29, gaps G between the inclined portions that are positioned between the first and third bent portions 21*n* and 21*p* and the second and fourth bent portions 21*m* and 21*o* of the first and second coil terminals 21*h* and 21*j* can be ensured. Circumferential insulation distances between the first and second coil terminals 21*h* and 21*j* are thereby ensured, improving electrical insulation.

Because the base portion 154*a* is disposed between the row of first coil terminals 21*h* and the row of second coil end portions 21*f*, and the base portion 155*a* is disposed between the row of second coil terminals 21*j* and the row of second coil end portions 21*f*, radial insulation distances between the first coil terminals 21*h* and the second coil end portions 21*f* are ensured, and insulation distances between the second coil terminals 21*j* and the second coil end portions 21*f* are also ensured, improving electrical insulation.

Because the radially outer and radially inner insulating papers 154 and 155 are produced using an insulating sheet material, manufacturing is facilitated, and reductions in cost can be achieved, and the thicknesses of the radially outer and radially inner insulating papers 154 and 155 can also be made thinner, enabling the coil ends to be reduced in size.

Because the first through third insulating papers 151, 152, and 153 are inserted inside the first through third coil end portions 21*e*, 21*f*, and 21*g*, electrical insulation in the coil ends that are constituted by the first through third coil end portions 21*e*, 21*f*, and 21*g* is improved.

Moreover, in Embodiment 1 above, the radially outer and radially inner insulating papers are each disposed in a single layer in a radial direction, but one annular base portion or a plurality of annular base portions may also be disposed in addition to the radially outer and radially inner insulating papers. Base portions will thereby be disposed in two layers, or in three or more layers, in a radial direction, improving electrical insulation. In addition, even if one of the base portions is torn, the possibility that an identical position on another base portion will be torn is extremely low, enabling electrical insulation to be ensured, and thereby enabling the reliability of the electrical insulation to be increased. Furthermore, if axially inner end portions of a plurality of base portions that are disposed together are linked by a bridge portion, the number of parts can be reduced, improving productivity.

In Embodiment 1 above, a step of bending and twisting first and second coil terminals of coils without bent portions was implemented after a winding assembly was produced by arranging the coils without bent portions in a row in a circumferential direction, but a step of bending and twisting first and second coil terminals of coils without bent portions may be implemented after the coils without bent portions are mounted to an armature core, or a step of bending and twisting the first and second coil terminals may be implemented in a step of forming the coils.

Embodiment 2

Figure 30:
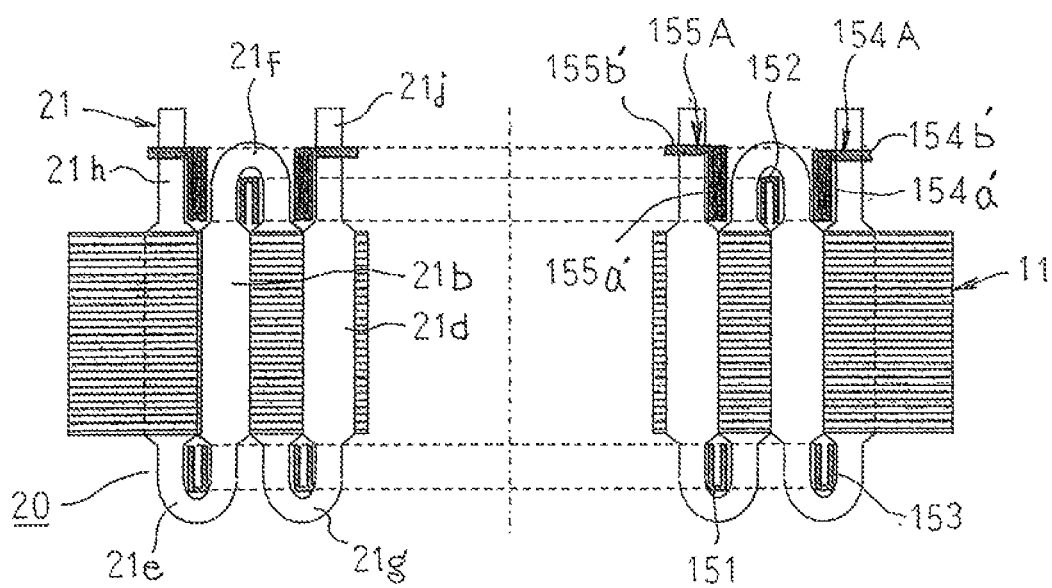
FIG. 30 is a cross section that schematically shows an armature in a rotary electric machine according to Embodiment 2 of the present invention.

FIG. 30 is a cross section that schematically shows an armature in a rotary electric machine according to Embodiment 2 of the present invention.

In FIG. 30, a radially outer insulating paper 154A is a resin molded body in which an annular base portion 154*a*' and protruding portions 154*b*' are formed integrally. A radially inner insulating paper 155A is a resin molded body in which an annular base portion 155*a*' and protruding portions 155*b*' are formed integrally.

Moreover, the rest of the configuration is formed in a similar or identical manner to that of Embodiment 1 above.

In Embodiment 2, because the radially outer and radially inner insulating papers 154A and 155A are resin molded bodies, thicknesses are increased in order to ensure resin fluidity during resin molding. Consequently, insulation distances can be reliably ensured, improving electrical insulation, and the risk of the radially outer and radially inner insulating papers 154A and 155A being torn is also reduced, enabling reliability of electrical insulation to be increased.

Now, if radially outer and radially inner insulating papers are produced using resin molded bodies, then complicated molds are required, and thicknesses must also be greater than or equal to required thicknesses in order to ensure resin fluidity during resin molding. Thus, from viewpoints of reductions in cost and reductions in size, it is desirable for the radially outer and radially inner insulating papers to be produced using insulating sheets.

Embodiment 3

Figure 31:
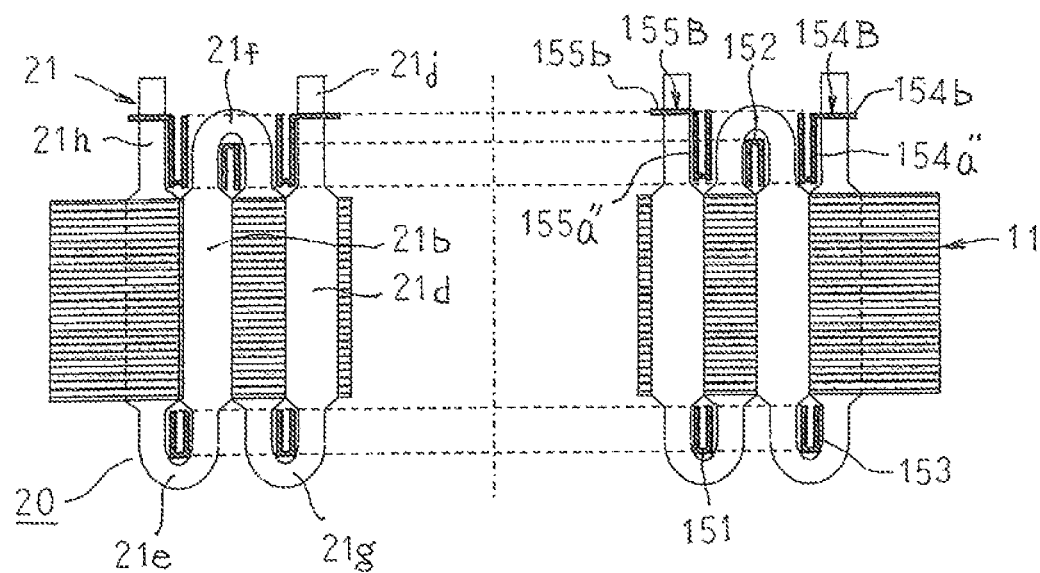
FIG. 31 is a cross section that schematically shows an armature in a rotary electric machine according to Embodiment 3 of the present invention.

FIG. 31 is a cross section that schematically shows an armature in a rotary electric machine according to Embodiment 3 of the present invention.

In FIG. 31, an annular base portion 154a" of a radially outer insulating paper 154B is folded in half axially at an axially central portion to form two layers in a radial direction. An annular base portion 155a" of a radially inner insulating paper 155B is folded in half axially at a central portion in a width direction to form two layers in a radial direction.

Moreover, the rest of the configuration is formed in a similar or identical manner to that of Embodiment 1 above.

In Embodiment 3, because the base portions 154a" and 155a" are folded in half at axially central portions to form two layers in a radial direction, rigidity of the radially outer and radially inner insulating papers 154B and 155B is increased. Thus, mounting of the radially outer and radially inner insulating papers 154B and 155B to the armature winding 20 is facilitated, and the occurrence of buckling and creasing of the radially outer and radially inner insulating papers 154B and 155B during mounting to the armature winding 20 is suppressed, increasing productivity.

Radial insulation distances between the first coil terminals 21h and the second coil end portions 21f are ensured, and radial insulation distances between the second coil terminals 21j and the second coil end portions 21f are also ensured, improving electrical insulation. In addition, even if one half of the folded base portions 154a" and 155a" were torn, because electrical insulation is ensured by the other half, reliability of electrical insulation can be increased.

Embodiment 4

Figure 32:
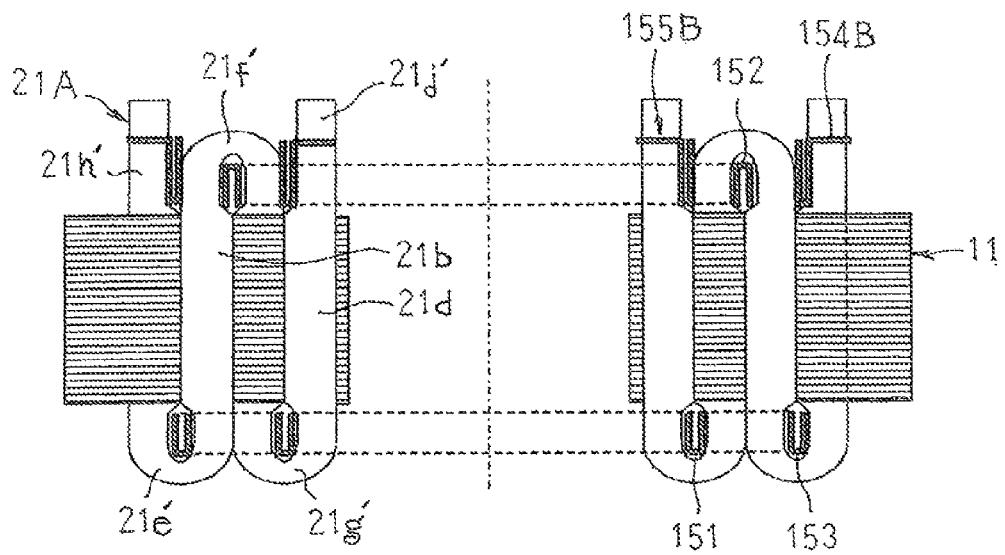
FIG. 32 is a cross section that schematically shows an armature in a rotary electric machine according to Embodiment 4 of the present invention.

FIG. 32 is a cross section that schematically shows an armature in a rotary electric machine according to Embodiment 4 of the present invention.

In FIG. 32, first through third coil end portions 21e', 21f', and 21g' and first and second coil terminals 21h' and 21j' are deformed such that only one radial surface is hollowed out compared to first through fourth rectilinear portions 21a, 21b, 21c, and 21d.

Moreover, the rest of the configuration is formed in a similar or identical manner to that of Embodiment 3 above.

In Embodiment 4, first through third coil end portions 21e', 21f', and 21g' and first and second coil terminals 21h' and 21j' of coils 21A are deformed such that only one radial surface is hollowed out compared to first through fourth rectilinear portions 21a, 21b, 21c, and 21d. Thus, because radial gaps inside the first through third coil end portions 21e', 21f', and 21g' into which the first through third insulating papers 151, 152, and 153 are inserted are wider, interphase insulation can be improved without increasing radial dimensions of the coil ends.

Embodiment 5

Figure 33:
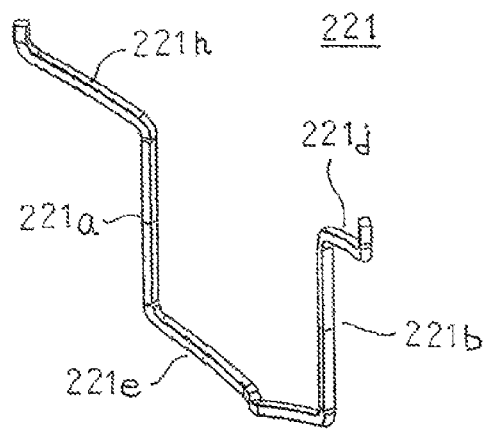
FIG. 33 is an oblique projection that shows a coil that constitutes part of an armature winding in a rotary electric machine according to Embodiment 5 of the present invention.
Figure 34:
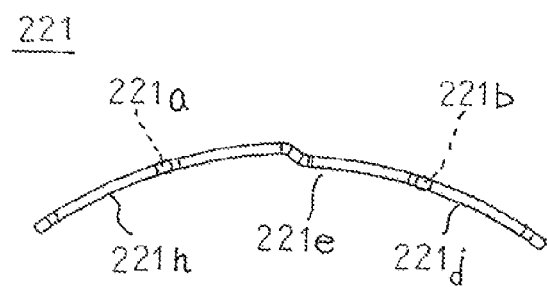
FIG. 34 is an end elevation that shows the coil that constitutes part of the armature winding in the rotary electric machine according to Embodiment 5 of the present invention viewed from a vicinity of first and second coil terminals.
Figure 35:
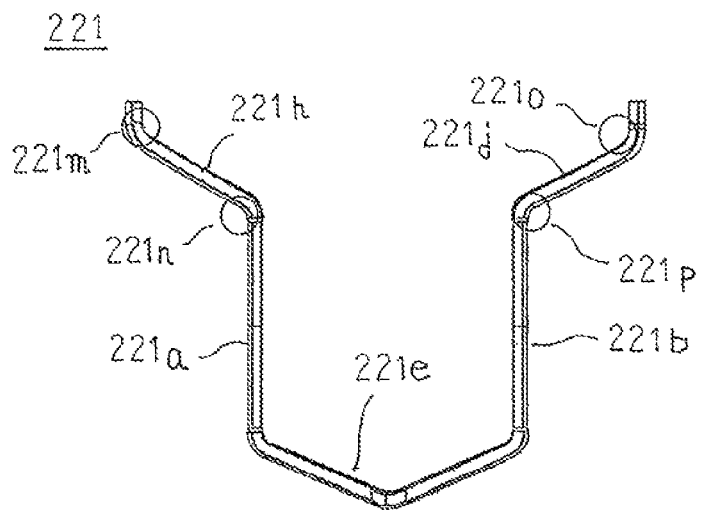
FIG. 35 is a front elevation that shows the coil that constitutes part of the armature winding in the rotary electric machine according to Embodiment 5 of the present invention.
Figure 36:
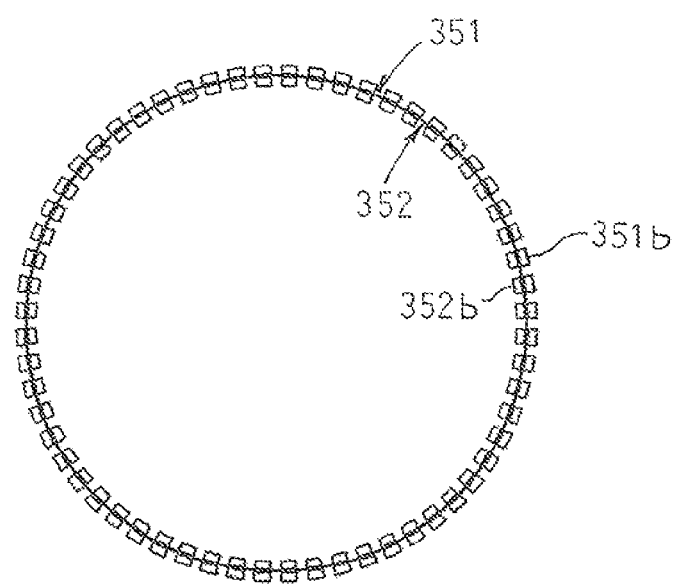
FIG. 36 is a front elevation that shows an insulating paper in the rotary electric machine according to Embodiment 5 of the present invention.
Figure 37:
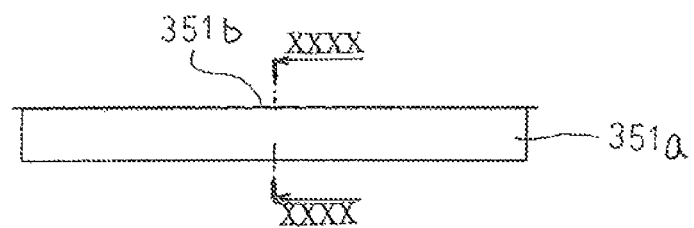
FIG. 37 is a side elevation that shows the insulating paper in the rotary electric machine according to Embodiment 5 of the present invention.
Figure 38:
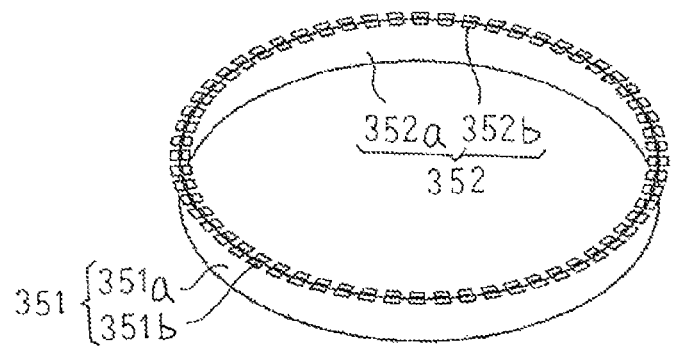
FIG. 38 is an oblique projection that shows the insulating paper in the rotary electric machine according to Embodiment 5 of the present invention.
Figure 39:
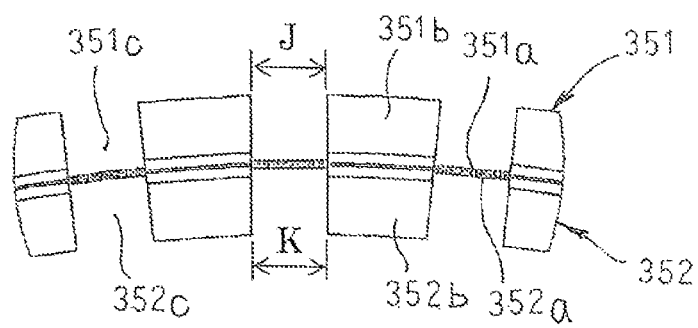
FIG. 39 is a partial front elevation that shows the insulating paper in the rotary electric machine according to Embodiment 5 of the present invention.
Figure 40:
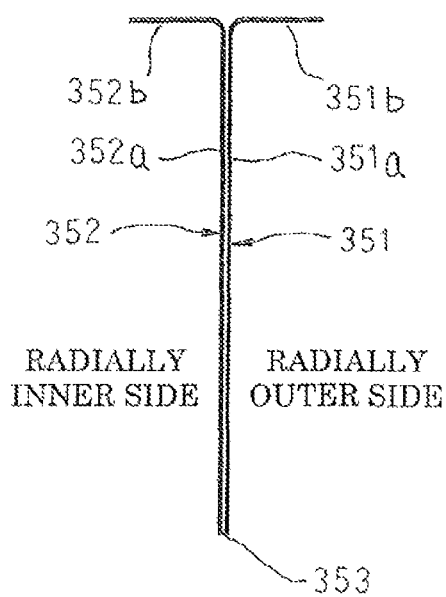
FIG. 40 is a cross section that is taken along Line XXXX-XXXX in FIG. 37 so as to be viewed in the direction of the arrows.
Figure 41:
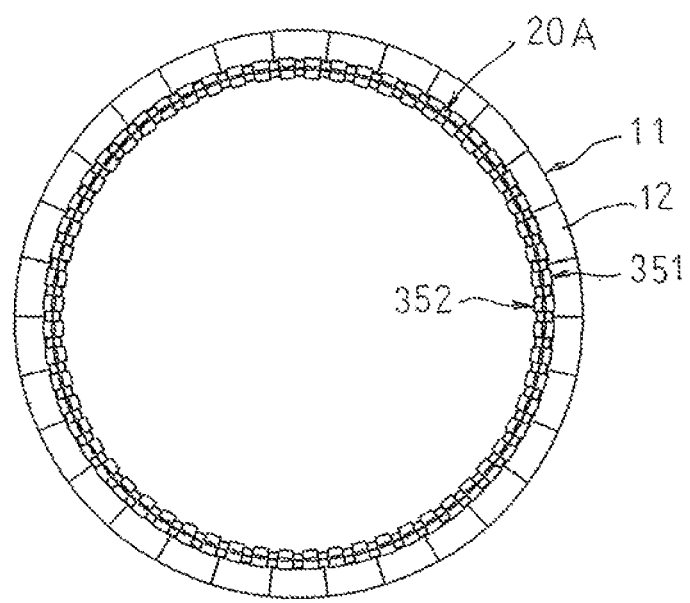
FIG. 41 is an end elevation that shows an armature in the rotary electric machine according to Embodiment 5 of the present invention when viewed from a vicinity of a first axial end.
Figure 42:
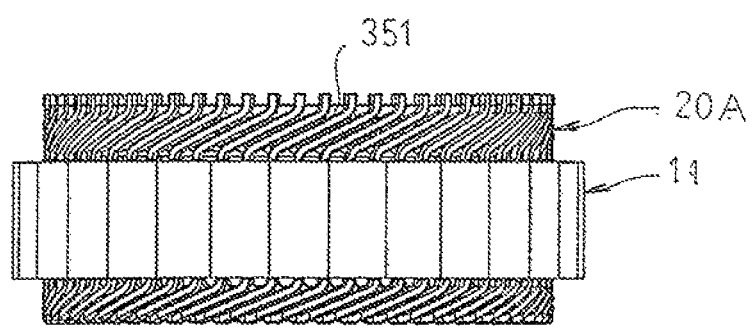
FIG. 42 is a side elevation that shows the armature in the rotary electric machine according to Embodiment 5 of the present invention.
Figure 43:
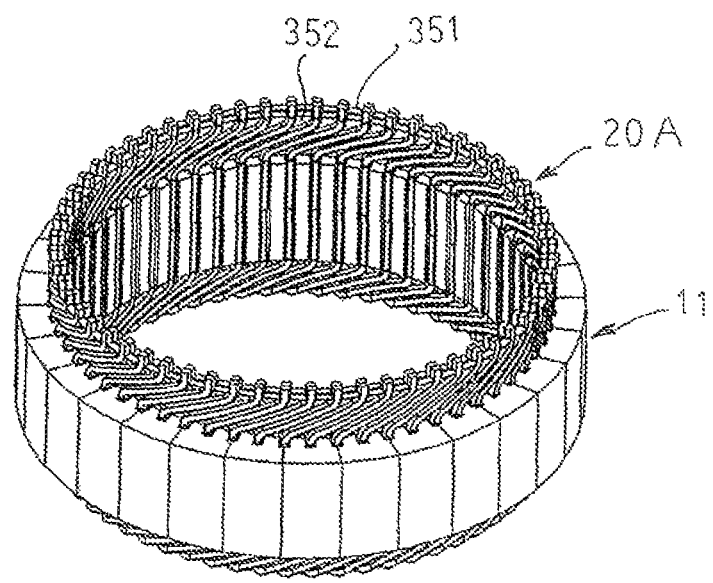
FIG. 43 is an oblique projection that shows the armature in the rotary electric machine according to Embodiment 5 of the present invention.
Figure 44:
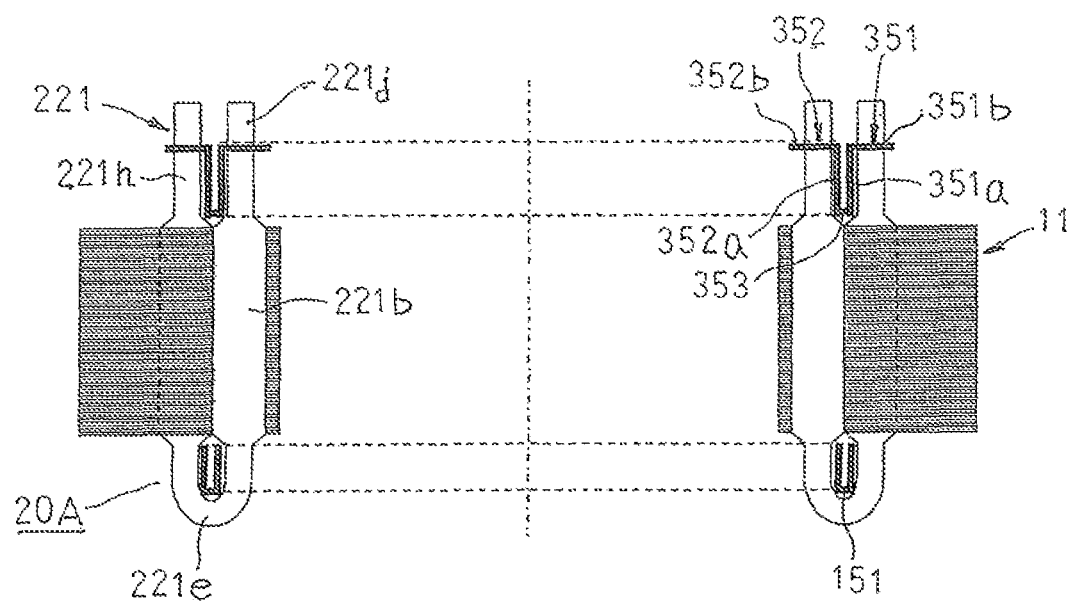
FIG. 44 is a cross section that schematically shows the armature in the rotary electric machine according to Embodiment 5 of the present invention.

FIG. 33 is an oblique projection that shows a coil that constitutes part of an armature winding in a rotary electric machine according to Embodiment 5 of the present invention, FIG. 34 is an end elevation that shows the coil that constitutes part of the armature winding in the rotary electric machine according to Embodiment 5 of the present invention viewed from a vicinity of first and second coil terminals, FIG. 35 is a front elevation that shows the coil that constitutes part of the armature winding in the rotary electric machine according to Embodiment 5 of the present invention, FIG. 36 is a front elevation that shows an insulating paper in the rotary electric machine according to Embodiment 5 of the present invention, FIG. 37 is a side elevation that shows the insulating paper in the rotary electric machine according to Embodiment 5 of the present invention, FIG. 38 is an oblique projection that shows the insulating paper in the rotary electric machine according to Embodiment 5 of the present invention, FIG. 39 is a partial front elevation that shows the insulating paper in the rotary electric machine according to Embodiment 5 of the present invention, FIG. 40 is a cross section that is taken along Line XXXX-XXXX in FIG. 37 so as to be viewed in the direction of the arrows, FIG. 41 is an end elevation that shows an armature in the rotary electric machine according to Embodiment 5 of the present invention when viewed from a vicinity of a first axial end, FIG. 42 is a side elevation that shows the armature in the rotary electric machine according to Embodiment 5 of the present invention, FIG. 43 is an oblique projection that shows the armature in the rotary electric machine according to Embodiment 5 of the present invention, and FIG. 44 is a cross section that schematically shows the armature in the rotary electric machine according to Embodiment 5 of the present invention.

In Embodiment 5, a coil 221 is produced by forming a conductor wire that has a circular cross section that has a diameter d, that is made of jointless continuous copper wire or aluminum wire that is coated with an insulating enamel resin, for example, into a U shape. Moreover, the coil 221 may alternatively be produced using a conductor wire that has a rectangular cross section.

As shown in FIGS. 33 through 35, the coil 221 includes: first and second rectilinear portions 221a and 221b that are at an angular spacing of six slots apart; a first coil end portion 221e that links second ends of the first and second rectilinear portions 221a and 221b to each other; a first coil terminal 221h that protrudes from a first end of the first rectilinear portion 221a; and a second coil terminal 221j that protrudes from a first end of the second rectilinear portion 221b.

This coil 221 is produced such that the first rectilinear portion 221a is housed in a first layer inside a first slot, and the second rectilinear portion 221b is housed in a second layer inside a slot that is separated by an angular spacing of six slots in a first circumferential direction from the first slot. In other words, the first coil end portion 21e is produced so as to maintain its radial position from the second end of the first rectilinear portion 221a and extend at a constant inclination in the first circumferential direction and axially outward, to be displaced by a radial width d of the conductor wire radially inward at a central portion (a top portion), and subsequently to maintain its radial position and extend at a reverse inclination in the first circumferential direction and axially inward to reach the second end of the second rectilinear portion 221b.

The first coil terminal 221h that extends outward from the first end of the first rectilinear portion 221a is produced so as to be bent at a first bent portion 221n, maintain its radial position, extend in a second circumferential direction and axially outward at a constant inclination, and subsequently be bent so as to be parallel to an axial direction at a second bent portion 221m to project axially outward. The second coil terminal 221j that extends outward from the first end of the second rectilinear portion 221b is produced so as to be bent at a third bent portion 221p, maintain its radial position, extend in the first circumferential direction and axially outward at a constant inclination, and subsequently be bent so as to be parallel to an axial direction at a fourth bent portion 221o to project axially outward.

Moreover, the first and second coil terminals 221h and 221j are connected to other coils 221, to electric power supplying portions, and to a neutral point in a vicinity of tip ends of the second and fourth bent portions 221m and 221o. The first end portion 221e and the first and second coil terminals 221h and 221j are formed by radially crushing conductor wire that has a circular cross section so as to have a cross-sectional shape that has a radial thickness d', where d'<d, and an axial thickness d", where d">d. An insulating coating is peeled off a vicinity of the tip ends of the second and fourth bent portions 221m and 221o of the first and second coil terminals 221h and 221j, and a circumferential width thereof is e, where e<d".

As shown in FIGS. 41 through 44, coils 221 that are configured in this manner are mounted to an armature core 11 so as to be arranged at a pitch of one slot in a circumferential direction such that the respective first and second rectilinear portions 221a and 221b are housed in a first layer inside a first slot and a second layer inside a second slot that are separated by an angular spacing of six slots, to constitute an armature winding 20A. A first insulating paper 151 is passed between rows of first rectilinear portions 221a and rows of second rectilinear portions 221b from a vicinity of a first axial end of the armature core 11 and mounted inside the first coil end portions 221e, which are arranged in a single row circumferentially. In addition, a radially outer insulating paper 351 and a radially inner insulating paper 352 are mounted between the row of the first coil terminals 221h and the row of second coil terminals 221j from a vicinity of a first axial end of the armature core 11.

Next, construction of the radially outer insulating paper 351 and the radially inner insulating paper 352 will be explained with reference to FIGS. 36 through 40.

Moreover, the radially outer and radially inner insulating papers 351 and 352 are produced so as to have an annular shape using an insulating sheet material that is made of a polyimide, polyethylene terephthalate (PET), or polyphenylene sulfide (PPS). Base portions 351a and 352a are produced by curving strip-shaped insulating sheets into annular shapes, the strip-shaped insulating sheets being cut out of the insulating sheet material, and protruding portions 351b and 352b are produced by bending the protruding portions that protrude from axially outer end portions of the base portions 351a and 352a radially outward or radially inward at root portions thereof. Axially inner end portions of the base portions 351a and 352a are connected by a bridge portion 353.

Here, the base portion 351a is a radially outer insulating paper base portion, the protruding portions 351b are radially outer insulating paper protruding portions, the base portion 352a is a radially inner insulating paper base portion, and the protruding portions 352b are radially inner insulating paper protruding portions. From a viewpoint of increasing the mountability of the radially outer and radially inner insulating papers 351 and 352, it is desirable for the width J of the slits 351c and the width K of the slits 352c to be greater than or equal to the width e at the tip end portions of the first and second coil terminals 221h and 221j.

The protruding portions 351b of the radially outer insulating paper 351 that is configured in this manner are inserted between tip end portions of adjacent first coil terminals 221h axially further outward than the second bent portions 221m, and the base portion 351a is disposed alongside the first coil terminals 221h on a radially inner side of the row of first coil terminals 21h. The protruding portions 352b of the radially outer insulating paper 352 that is configured in this manner are inserted between tip end portions of adjacent second coil terminals 221j axially further outward than the fourth bent portions 221o, and the base portion 352a is disposed alongside the row of second coil terminals 221j on a radially outer side of the row of second coil terminals 221j.

In Embodiment 5, a radially outer insulating paper 351 includes: an annular base portion 351a that is disposed alongside a row of first coil terminals 221h on a radially inner side of the row of first coil terminals 221h; and protruding portions 351b that each protrude radially outward from an axially outer end portion of the base portion 351a and that are inserted between tip end portions of adjacent first coil terminals 221h axially further outward than second bent portions 221m. Similarly, a radially inner insulating paper 352 includes: an annular base portion 352a that is disposed alongside a row of second coil terminals 221j on a radially outer side of the row of second coil terminals 221j; and protruding portions 352b that each protrude radially inward from an axially outer end portion of the base portion 352a and that are inserted between tip end portions of adjacent second coil terminals 221j axially further outward than fourth bent portions 221o.

Consequently, similar or identical effects to those in Embodiment 1 above can also be achieved in Embodiment 5.

According to Embodiment 5, the base portion 351a of the radially outer insulating paper 351 and the base portion 352a of the radially inner insulating paper 352 are connected by a bridge portion 353. Thus, because the radially outer and radially inner insulating papers 351 and 352 form a single part, the number of parts is reduced, increasing productivity. Because the rigidity of the base portions 351a and 352a is increased, mounting of the radially outer and radially inner insulating papers 351 and 352 to the armature winding 20A is facilitated, and the occurrence of buckling and creasing of the radially outer and radially inner insulating papers 351 and 352 during mounting to the armature winding 20A is also suppressed, improving productivity.

Moreover, in Embodiment 5 above, the radially outer insulating paper and the radially inner insulating paper are integrated by connecting the base portion of the radially outer insulating paper and the base portion of the radially inner insulating paper by a bridge portion, but the radially outer insulating paper and the radially inner insulating paper may be integrated by folding a base portion in half at an axially central portion.

In Embodiment 5 above, an armature core is configured by linking sixty core blocks into an annular shape, but an armature core may be configured using a single core in which annular core laminations are laminated and integrated, annular core laminations being punched out of an electromagnetic steel sheet, for example.

Embodiment 6

Figure 45:
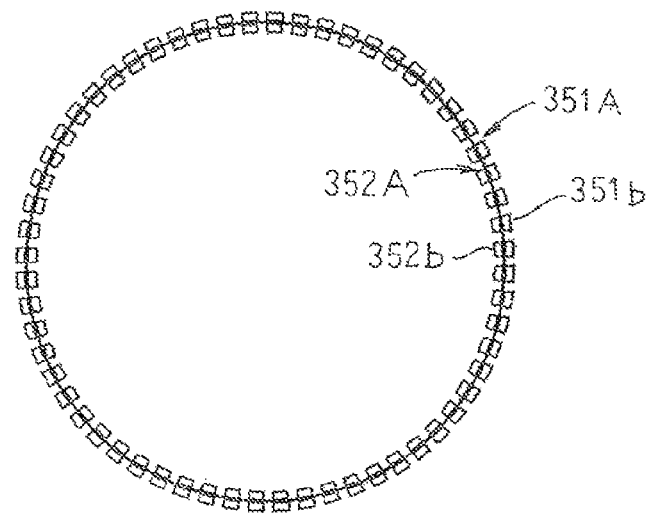
FIG. 45 is a front elevation that shows an insulating paper in a rotary electric machine according to Embodiment 6 of the present invention.
Figure 46:
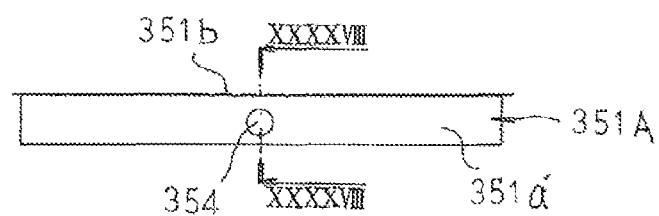
FIG. 46 is a side elevation that shows the insulating paper in the rotary electric machine according to Embodiment 6 of the present invention.
Figure 47:
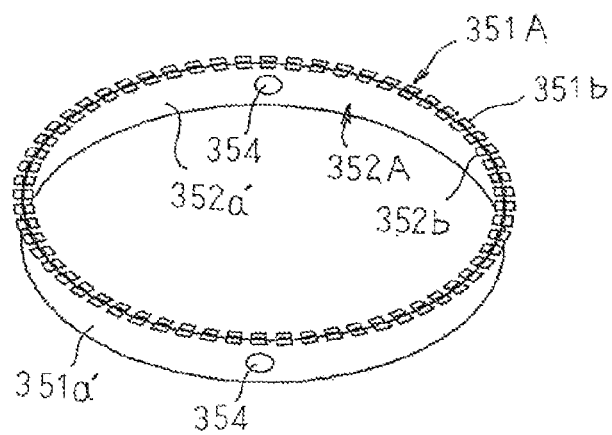
FIG. 47 is an oblique projection that shows the insulating paper in the rotary electric machine according to Embodiment 6 of the present invention.
Figure 48:
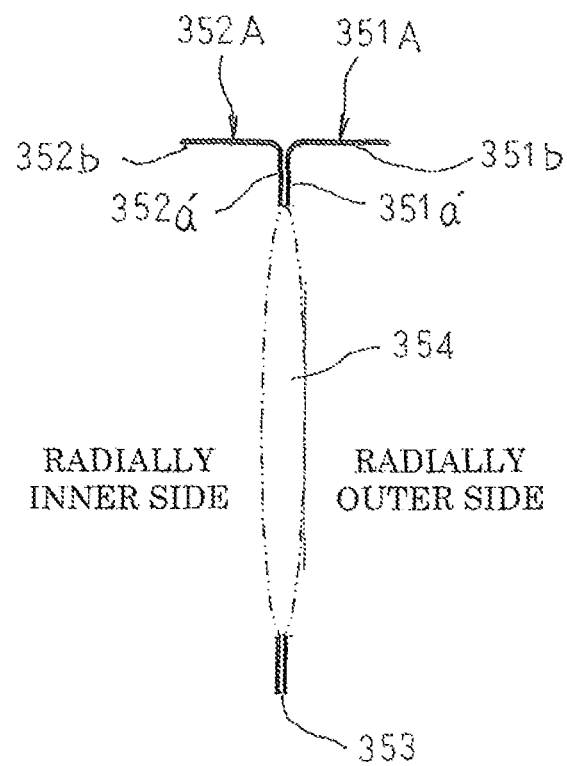
FIG. 48 is a cross section that is taken along Line XXXXVIII-XXXXVIII in FIG. 46 so as to be viewed in the direction of the arrows.
Figure 49:
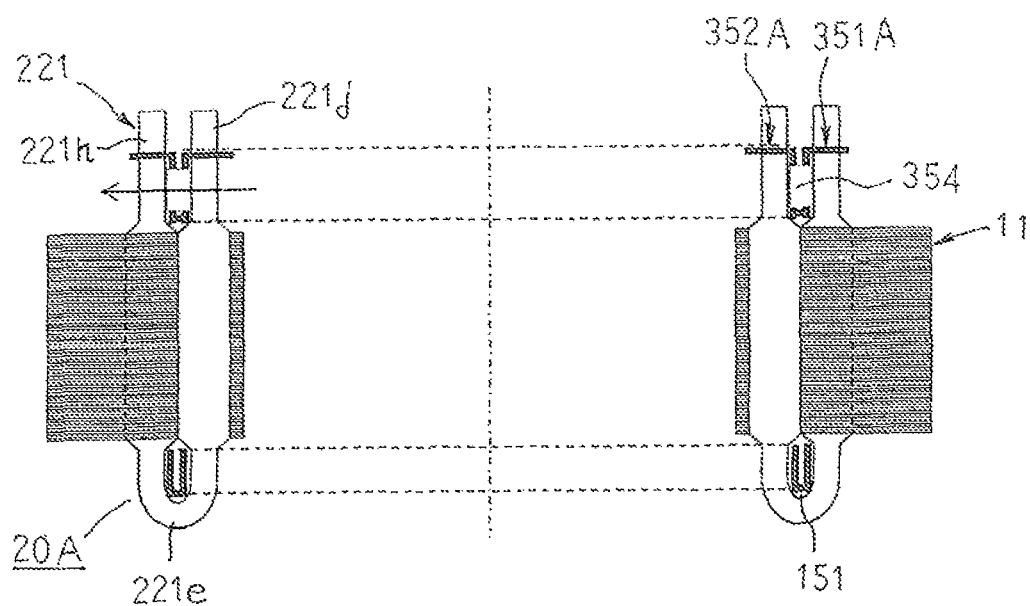
FIG. 49 is a cross section that schematically shows an armature in the rotary electric machine according to Embodiment 6 of the present invention.

FIG. 45 is a front elevation that shows an insulating paper in a rotary electric machine according to Embodiment 6 of the present invention, FIG. 46 is a side elevation that shows the insulating paper in the rotary electric machine according to Embodiment 6 of the present invention, FIG. 47 is an oblique projection that shows the insulating paper in the rotary electric machine according to Embodiment 6 of the present invention, FIG. 48 is a cross section that is taken along Line XXXXVIII-XXXXVIII in FIG. 46 so as to be viewed in the direction of the arrows, and FIG. 49 is a cross section that schematically shows an armature in the rotary electric machine according to Embodiment 6 of the present invention.

In FIGS. 45 through 48, penetrating apertures 354 are formed so as to pass radially through base portions 351*a*' and 352*a*' of radially outer and radially inner insulating papers 351A and 352A.

Moreover, the rest of the configuration is formed in a similar or identical manner to that of Embodiment 5 above.

Consequently, similar or identical effects to those in Embodiment 5 above can also be achieved in Embodiment 6.

According to Embodiment 6, because penetrating apertures 354 are formed so as to pass radially through base portions 351*a*' and 352*a*' of radially outer and radially inner insulating papers 351A and 352A, a cooling medium such as cooling air, cooling oil, etc., flows radially through the penetrating apertures 354, as indicated by an arrow in FIG. 49, improving cooling of the armature.

Moreover, in Embodiment 6 above, two penetrating apertures are formed on the base portions of the radially outer and radially inner insulating papers, but the number of penetrating apertures is not limited to two, provided that it is one or more.

In Embodiments 1 through 4 above, coils are produced by winding a conductor wire into a δ-shaped coil pattern, and in Embodiments 5 and 6 above, coils are produced by winding a conductor wire into a U-shaped coil pattern, but the coils are not limited to coils in δ-shaped or U-shaped coil patterns, and need only be configured so as to have 2n rectilinear portions that are inserted into slots, and (2n−1) coil end portions that link the 2n rectilinear portions consecutively, where n is an integer that is greater than or equal to one, and such that first coil terminals of the coils protrude outward from a radially outermost position inside the slots at a first axial end, and second terminals of the coils protrude outward from a radially innermost position inside the slots at the first axial end, when mounted to an armature core at a pitch of one slot, and may be hexagonal coils that are produced by winding a conductor wire into a helical coil pattern, for example.

The invention claimed is:

1. A rotary electric machine comprising an armature that comprises:
   an annular armature core in which slots are arranged circumferentially; and
   an armature winding that is mounted to said armature core,
   said armature winding being configured by mounting coils to said armature core circumferentially at a pitch of one slot, said coils comprising:
      2n rectilinear portions that are inserted into said slots, where n is an integer that is greater than or equal to one; and
      (2n−1) coil end portions that link said 2n rectilinear portions consecutively, and said coils being configured such that first coil terminals protrude outward at a first axial end of said armature core from a radially outermost position inside said slots, are bent at first bent portions in a vicinity of roots thereof so as to be inclined in a first circumferential direction, and are bent at second bent portions near tip ends so as to extend axially outward, and second coil terminals protrude outward at a first axial end of said armature core from a radially innermost position inside said slots, are bent at third bent portions in a vicinity of roots thereof so as to be inclined in said first circumferential direction or a second circumferential direction, and are bent at fourth bent portions near tip ends so as to extend axially outward, wherein:
   said rotary electric machine comprises:
      a radially outer insulating paper that is mounted on a radially inner side of a row of said first coil terminals; and
      a radially inner insulating paper that is mounted on a radially outer side of a row of said second coil terminals;
   said radially outer insulating paper comprises:
      an annular radially outer insulating paper base portion that is disposed so as to lie alongside said first coil terminals on said radially inner side of said row of first coil terminals; and
      radially outer insulating paper protruding portions that each protrude radially outward from an axially outer end portion of said radially outer insulating paper base portion, and that are inserted between adjacent first coil terminals axially further outward than said second bent portions; and
   said radially inner insulating paper comprises:
      an annular radially inner insulating paper base portion that is disposed so as to lie alongside said second coil terminals on said radially outer side of said row of second coil terminals; and
      radially inner insulating paper protruding portions that each protrude radially inward from an axially outer end portion of said radially inner insulating paper base portion, and that are inserted between adjacent second coil terminals axially further outward than said fourth bent portions.

2. The rotary electric machine according to claim 1, wherein a penetrating aperture is formed so as to pass radially through said radially outer insulating paper base portion and said radially inner insulating paper base portion.

3. The rotary electric machine according to claim 1, wherein said radially outer insulating paper base portion and said radially inner insulating paper base portion are each produced by forming a strip-shaped insulating sheet into an annular shape by bending, and said radially outer insulating paper protruding portions and said radially inner insulating paper protruding portions are each produced by bending and folding root portions of protruding portions that protrude outward from said axially outer end portion of said strip-shaped insulating sheet.

4. The rotary electric machine according to claim 3, wherein a penetrating aperture is formed so as to pass radially through said radially outer insulating paper base portion and said radially inner insulating paper base portion.

5. The rotary electric machine according to claim 3, wherein said radially outer insulating paper base portion and said radially inner insulating paper base portion are each folded over in an axial direction so as to be formed into two layers in a radial direction.

6. The rotary electric machine according to claim 5, wherein a penetrating aperture is formed so as to pass radially through said radially outer insulating paper base portion and said radially inner insulating paper base portion.

7. The rotary electric machine according to claim 3, wherein a base portion that is formed by bending a strip-shaped insulating sheet into an annular shape is disposed together with each of said radially outer insulating paper base portion and said radially inner insulating paper base portion on a radially inner side of said row of first coil terminals and on a radially outer side of said row of second coil terminals.

8. The rotary electric machine according to claim 7, wherein a penetrating aperture is formed so as to pass radially through said base portion and said radially outer insulating paper base portion that are disposed together, and through said base portion and said radially inner insulating paper base portion that are disposed together.

9. The rotary electric machine according to claim 7, wherein axially inner end portions of said base portion and said radially outer insulating paper base portion that are disposed together are connected to each other, and axially inner end portions of said base portion and said radially inner insulating paper base portion that are disposed together are connected to each other.

10. The rotary electric machine according to claim 9, wherein a penetrating aperture is formed so as to pass radially through said base portion and said radially outer insulating paper base portion that are disposed together, and through said base portion and said radially inner insulating paper base portion that are disposed together.

11. A manufacturing method for a rotary electric machine according to claim 1, wherein said manufacturing method comprises a bent portion forming step in which said first bent portion, said second bent portion, said third bent portion, and said fourth bent portion are formed on said first coil terminals and said second coil terminals before a step of mounting said radially outer insulating paper and said radially inner insulating paper to said armature winding that is mounted to said armature core.

* * * * *